United States Patent [19]

Hamanishi

[11] Patent Number: 4,591,234

[45] Date of Patent: May 27, 1986

[54] REAR FOCUS CONVERSION LENS

[75] Inventor: Yoshinari Hamanishi, Tokyo, Japan

[73] Assignee: Nippon Kogaku K. K., Tokyo, Japan

[21] Appl. No.: 459,980

[22] Filed: Jan. 21, 1983

[30] Foreign Application Priority Data

Jan. 27, 1982 [JP] Japan .................................. 57-32194
Apr. 23, 1982 [JP] Japan .................................. 57-67061

[51] Int. Cl.⁴ .......................... G02B 9/34; G02B 9/60; G02B 15/02
[52] U.S. Cl. .................................... 350/422; 350/465; 350/469
[58] Field of Search ........................ 350/422, 465, 469

[56] References Cited

U.S. PATENT DOCUMENTS 4,206,971  3/1980  Hamanishi et al. .................. 350/422
4,253,736  3/1981  Momiyama ......................... 350/422

Primary Examiner—John K. Corbin
Assistant Examiner—Scott J. Sugarman
Attorney, Agent, or Firm—Shapiro and Shapiro

[57] ABSTRACT

A rear conversion lens removably mounted between an objective lens and a camera body for making the combined focal length of the rear conversion lens and the objective lens greater than the focal length of the objective lens includes a converter barrel, a lens group of negative refractive power movable in the converter barrel along the optical axis, and means for moving the lens group of negative refractive power along the optical axis. Focusing to objects from infinity to a short distance is effected by the movement of the lens group of negative refractive power by said moving means.

32 Claims, 42 Drawing Figures

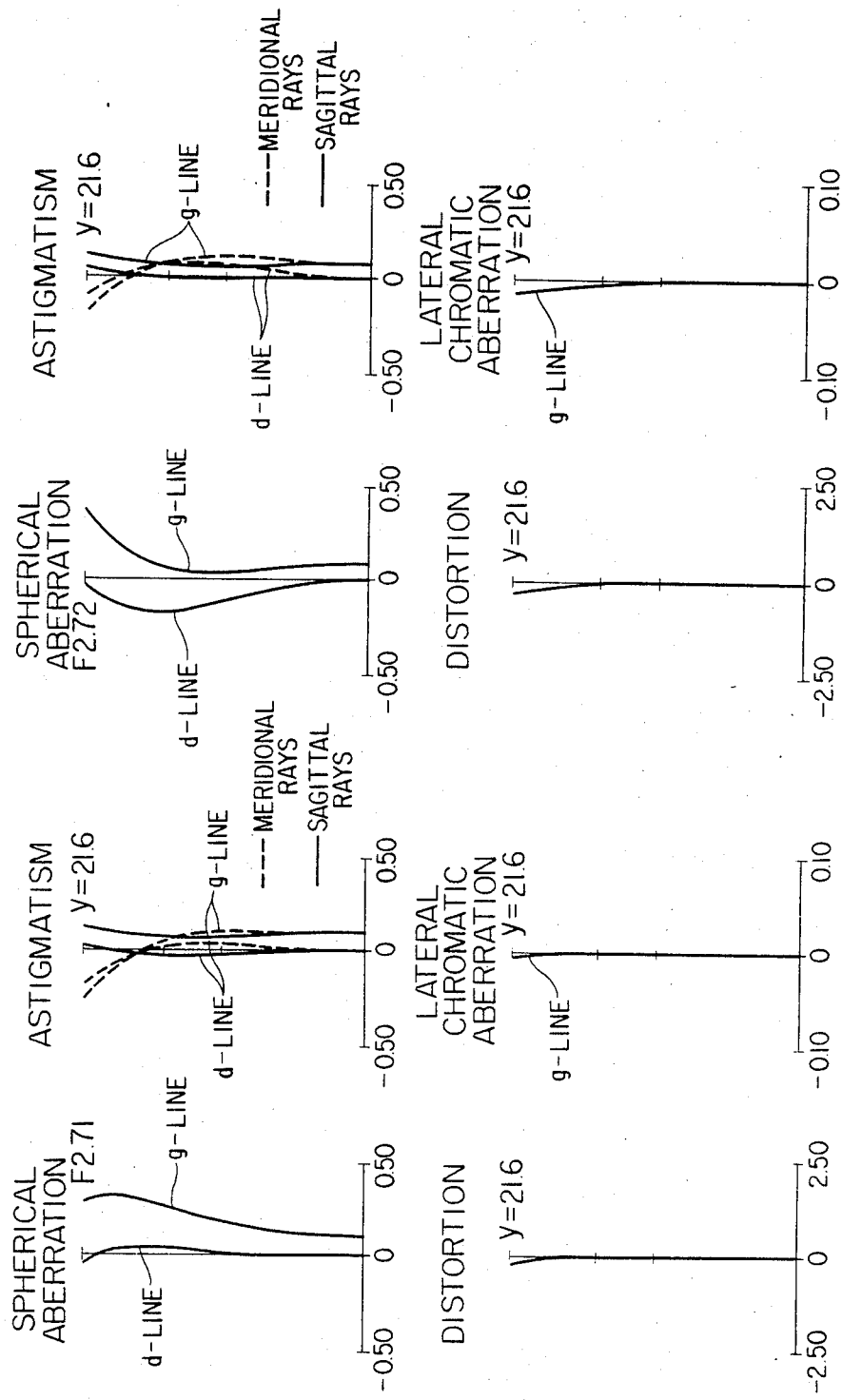

FIG. 22 (β=-0.7)

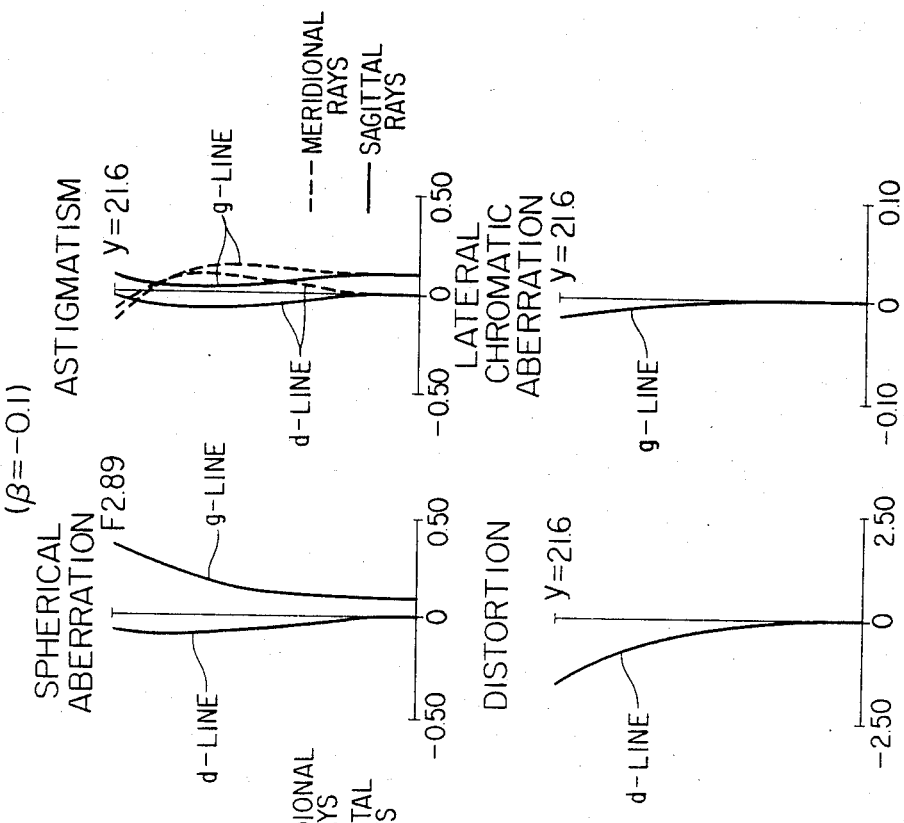
FIG. 24
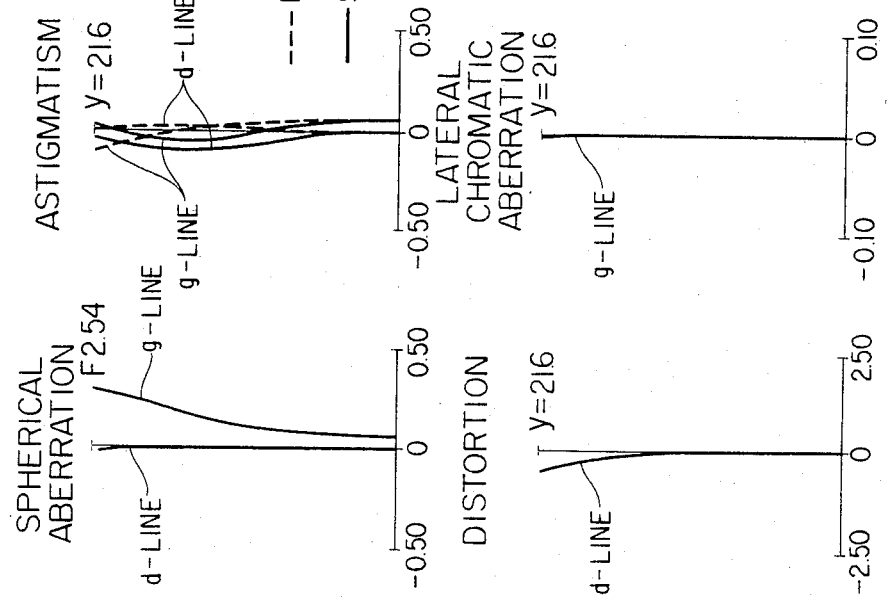
FIG. 25 (β=-0.1)

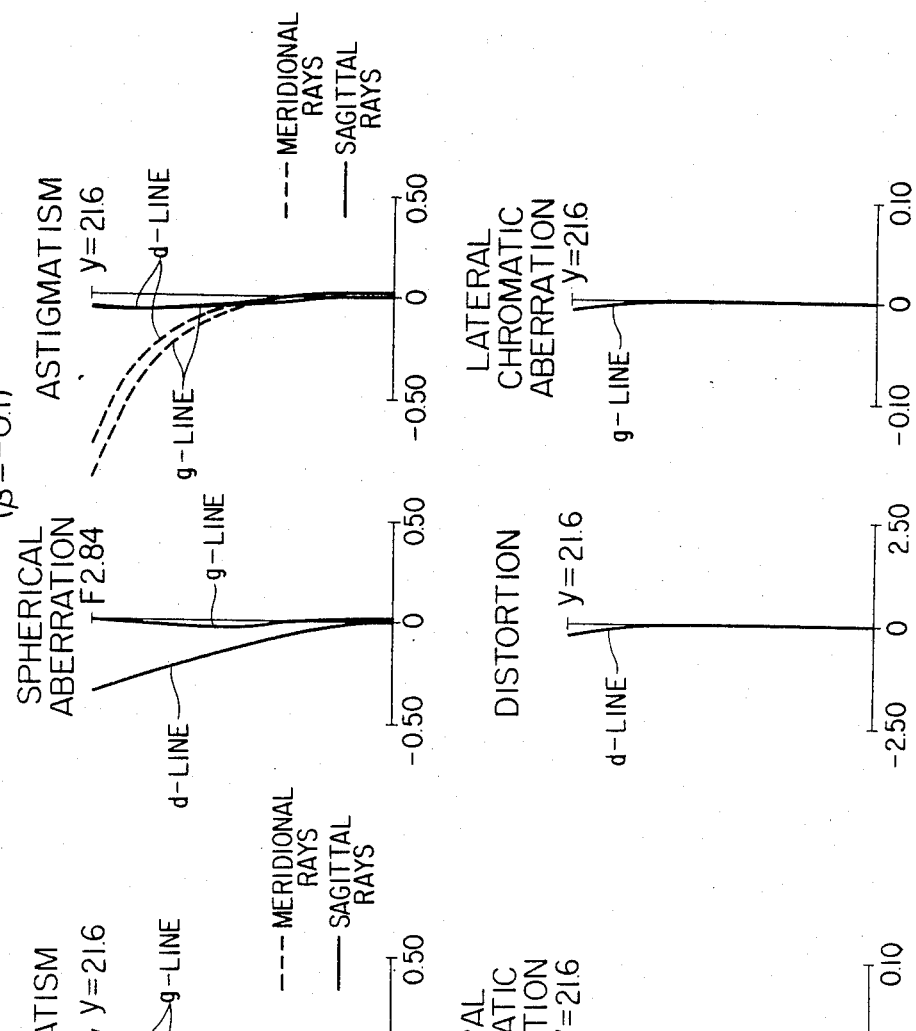
FIG. 33
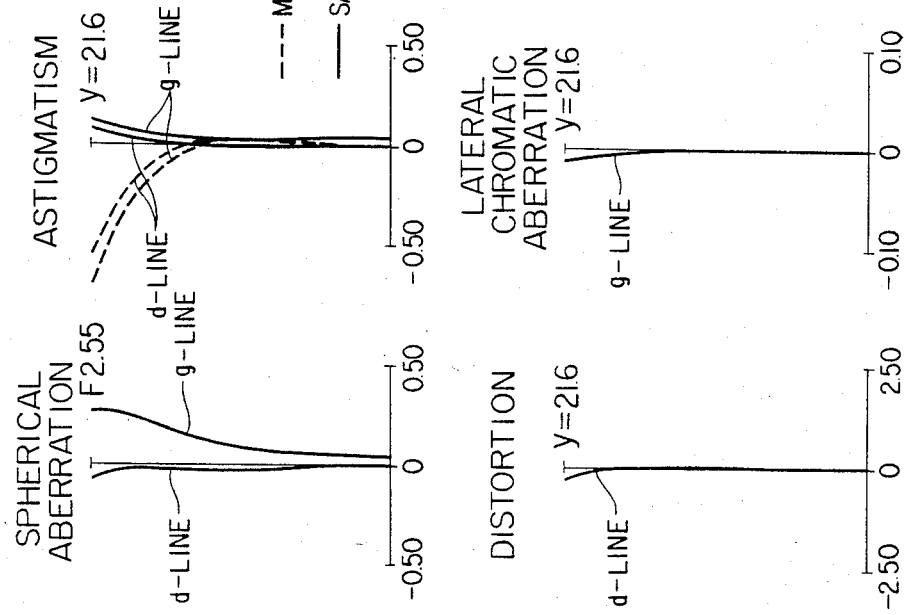
FIG. 34 ($\beta=-0.1$)

($\beta=-0.125$)

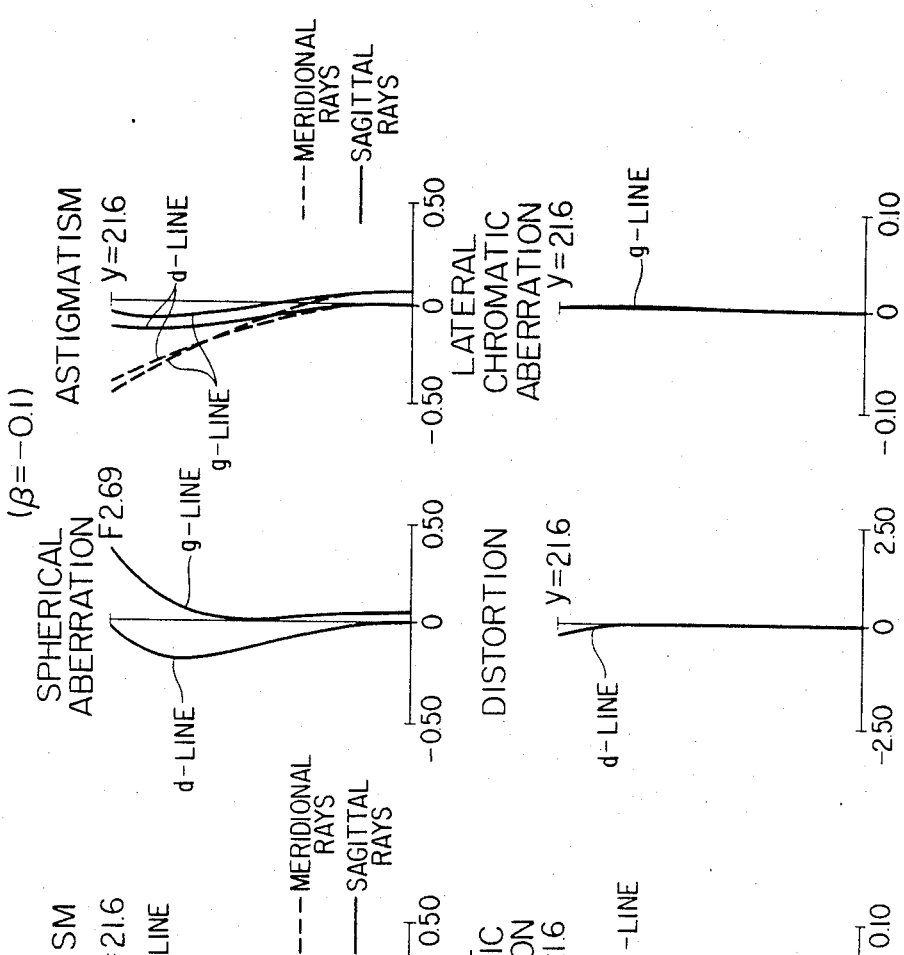
FIG. 39
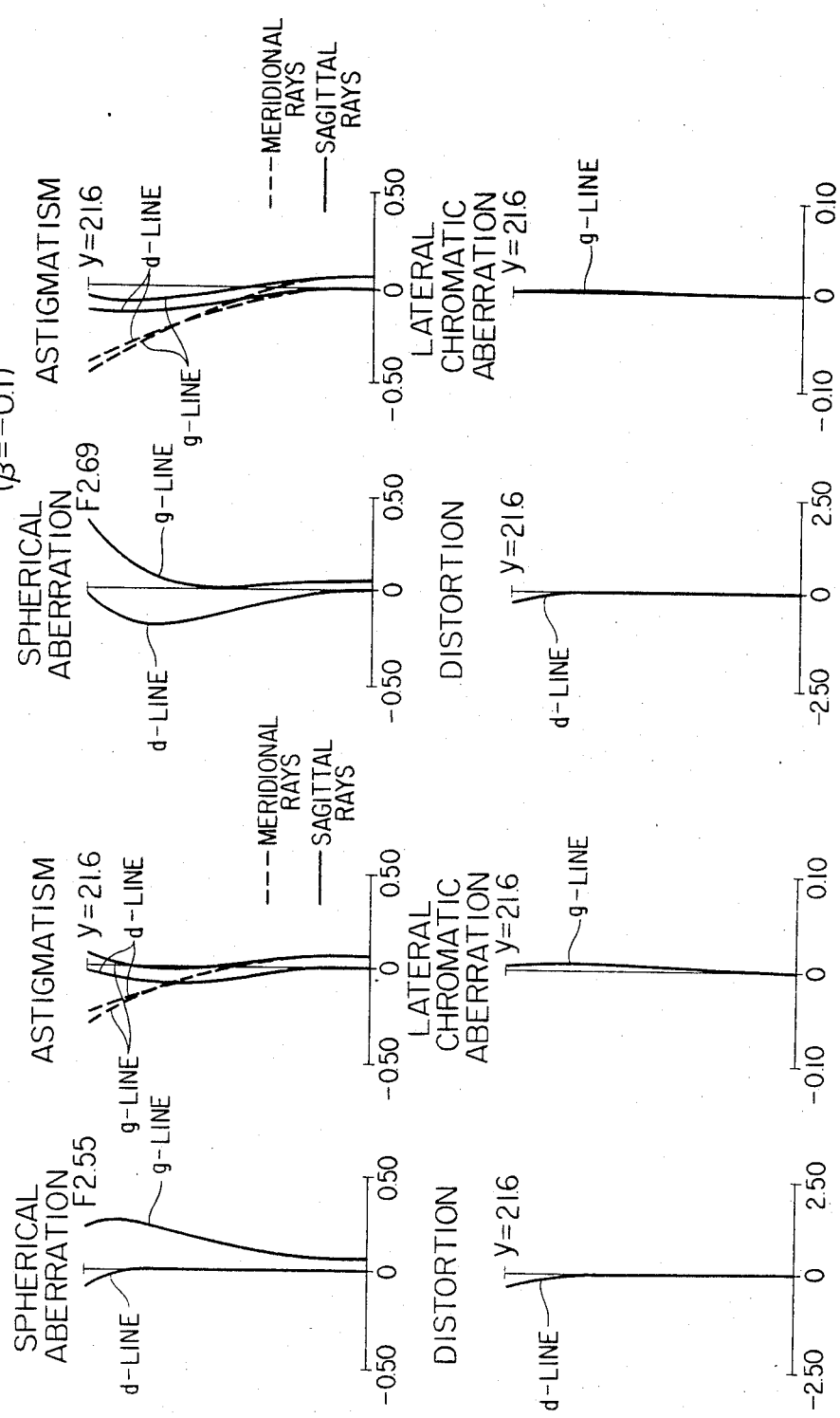
FIG. 40 (β=-0.1)

REAR FOCUS CONVERSION LENS

BACKGROUND OF THE INVENTION

1. Field of the Invention

This invention relates to a focusing rear conversion lens versatilely usable with all photographic objective lenses.

2. Description of the Prior Art

As the methods of focusing a photographic objective lens, there are known various methods such as the method comprising moving the entire objective lens system, the method comprising moving only some of the lenses within or rearward of the lens system, etc. In these focusing methods, optimum focusing systems are adopted depending on the specification of the objective lens, namely, depending on whether the objective lens is telephoto, a wide angle of view or zoom or up to what degree of photographic magnification the objective lens can be focused to a short distance object.

This has prevented a common focusing device from being used versatilely and has been very inconvenient where an automatic focusing device is provided in a camera. A basic construction for a single lens reflex camera in which a lens system exclusively for focusing is mounted between the objective lens and the camera body to enable automatic focusing is known, for example, from Japanese Laid-open Patent Application No. 28133/1979. However, in the device disclosed in this patent application, a focusing converter is comprised of a movable negative lens group and an imaging positive lens group and the focus detection is effected by a parallel light beam system between the two lens groups, and this unavoidably leads to a considerably large shape as an attachment. In order to make the device mountable on all objective lenses, it is necessary to make the device into a compact one mountable to both an objective lens of great aperture ratio and an objective lens of short back focal length and moreover maintain an excellent imaging performance, and the designing of a converter which will satisfy all these conditions has been very difficult.

SUMMARY OF THE INVENTION

It is a first object of the present invention to provide a focusing rear conversion lens which is versatilely mountable to all objective lenses and compact and yet can maintain an excellent imaging performance.

It is a second object of the present invention to provide a focusing rear conversion lens which can be focused to shorter distance objects while having versatility and moreover can maintain a more excellent imaging performance.

The invention will become fully apparent from the following detailed description thereof taken in conjunction with the accompanying drawings.

BRIEF DESCRIPTION OF THE DRAWINGS

FIG. 9 shows the various aberrations of the second embodiment in the infinity in-focus state.

FIG. 10 shows the various aberrations of the second embodiment in the short distance in-focus state.

FIGS. 21 and 22 show the various aberrations when the rear focus conversion lens of the sixth embodiment is mounted to the standard objective lens, FIG. 21 showing the infinity in-focus state and FIG. 22 showing the short distance in-focus state.

FIGS. 24 and 25 show the various aberrations when the rear focus conversion lens of the seventh embodiment is mounted to the standard objective lens, FIG. 24 showing the infinity in-focus state and FIG. 25 showing the short distance in-focus state.

FIGS. 33 and 34 show the various aberrations when the rear focus conversion lens of the tenth embodiment is mounted to the standard objective lens, FIG. 33 showing the infinity-in-focus state and FIG. 34 showing the short distance in-focus state.

FIGS. 39 and 40 show the various aberrations when the rear focus conversion lens of the twelfth embodiment is mounted to the standard objective lens, FIG. 39 showing the infinity in-focus state and FIG. 40 showing the short distance in-focus state.

DESCRIPTION OF THE PREFERRED EMBODIMENTS

A first rear focus conversion lens (hereinafter referred to as the RFC) according to the present invention is a rear conversion lens removably mounted between an objective lens and a camera body for making the combined focal length of the rear conversion lens and the objective lens greater than the focal length of the objective lens to achieve the above objects. This RFC has a lens group of negative refractive power movable on the optical axis relative to the objective lens and the camera body and can be focused to objects from infinity to a predetermined short distance by movement of the movable lens group. The negative lens group converts a convergent light beam from the objective lens to a less convergent light beam and condenses the converted convergent light beam on a predetermined image plane. The first RFC adopts a construction which satisfies the following conditions:

$$1.3 < \beta < 2.5 \quad (1)$$

$$\left| \frac{\Delta B_f}{f_R} \right| < 0.2 \quad (2)$$

where $\beta$ is the enlargement magnification of the focal length in the infinity-focused condition, $\Delta B_f$ is the amount of variation in the combined back focal length when the RFC is focused from the infinity to predetermined short distance and $f_R$ is the focal length of the rear conversion lens.

It is necessary for the RFC to be moved toward the image side for focusing, and in order to secure the amount of movement thereof sufficiently, it is necessary for the RFC to adopt a construction in which it is positioned on the object side as far as possible during the in-focus to infinity. Accordingly, as compared with the conventional popular rear conversion lens which is not moved, the difference between the distances of the positions at which the oblique light beam and the light beam from the object point on the axis cut the rear conversion lens from the optical axis is small and therefore, the degree of freedom of aberration correction is small and it is very difficult to well correct the various aberrations over the full range of in-focus.

Figure 1:
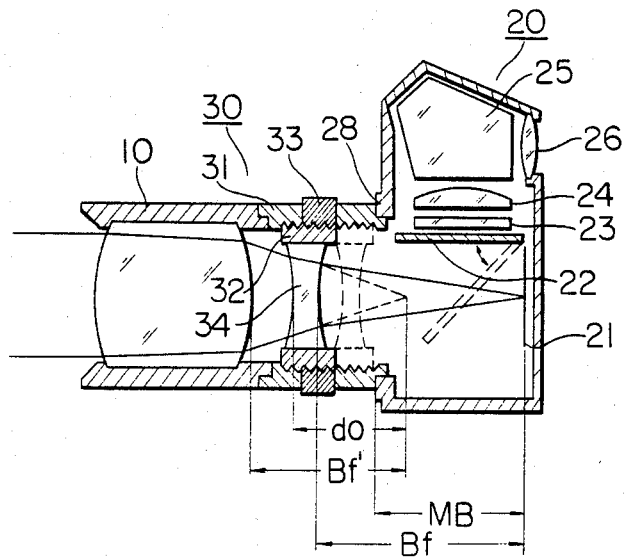
FIG. 1 is a cross-sectional view schematically showing a rear focus conversion lens according to the present invention as mounted between an objective lens and a single lens reflex camera body.

The first RFC according to the present invention will hereinafter be described with reference to the drawings. FIG. 1 is a cross-sectional view schematically showing the construction with the first RFC 30 of the present invention mounted between the objective lens 10 and the single lens reflex camera body 20. In FIG. 1, there is depicted the marginal ray from the on-axis infinite object point which reaches a film surface 21. The single lens reflex camera body 20 has a swingable reflecting mirror 22, a focusing screen 23, a condenser lens 24, a pentadach prism 25 and an eyepiece 26. The reflecting mirror 22 is normally obliquely disposed at the dotted-line position except during the exposure of the film surface 21. In the single lens reflex camera, to secure the swinging space of the swingable reflecting mirror 22, the distance between the lens mount surface 28 of the single lens reflex camera body 20 and the film surface 21, i.e., the so-called flange back MB, is determined to a value inherent to the camera body. The distance between the last lens surface of the objective lens and the film surface, i.e., the back focal length $B_f$ is designed to be sufficiently longer than the swinging space of the reflecting mirror 22. In the first RFC 30, an internal barrel 32 having a negative lens group 34 is provided within a converter barrel 31 so as to be movable in the direction of the optical axis by a focus ring 33. Accordingly, by rotating the focus ring 33, the negative lens group 34 is moved on the optical axis and focusing is effected to an object at a predetermined distance.

Thus, even with the first RFC 30 mounted on the objective lens, the back focal length of the composite system with the objective lens must be secured at a value greater than the swinging space of the reflecting mirror 22 and further, even when the principal point of the negative lens group forming the RFC is moved toward the image side for the in-focus to a short distance object, it is necessary to maintain a sufficient back focal length.

The first RFC according to the present invention must thus directly satisfy the condition as a rear conversion lens while, at the same time, it must satisfy further various conditions to sufficiently achieve the focusing function as well. Specifically, to provide versatility, there is an upper limit in the enlargement magnification to be borne by the RFC in order that the focusing accuracy may be maintained well even if a bright objective lens or a dark objective lens is mounted, and there is also a lower limit in the enlargement magnification because it is not desirable to secure a sufficient back focal length during the very short distance photography as well and to provide a very great amount of movement of the RFC.

Therefore, it is necessary to make the lens system of the RFC as thin as possible and thereby provide a high performance and to bring the image point of the objective lens, i.e., the object point of the RFC, as close as possible to the foremost lens surface during the in-focus to infinity and yet secure a sufficient back focal length when focused to the shortest distance object. It is also necessary to transmit a sufficient quantity of light to an objective lens of small F-number on which is mounted the RFC as well as an objective lens in which the position of the exit pupil is relatively distant from the image plane and therefore, the RFC must have a sufficient effective diameter and thus, must have a certain degree of lens center thickness, and this means a limitation in making the RFC thin. Also, it is possible to make the RFC thin by reducing the number of lenses of the RFC, but the RFC has a relatively strong negative refractive power and therefore, correction of astigmatic difference, Petzval sum, spherical aberration and chromatic aberration becomes more difficult and a sufficient optical performance cannot be expected.

Under these various limitations, the optimum basic construction is indicated by the aforementioned conditions (1) and (2). If the lower limit of condition (1) is exceeded, it will become difficult to sufficiently secure the back focal length of the combined system of the RFC and the objective lens during infinity focusing and the amount of movement for focusng will be too small and therefore, it will be difficult to secure a sufficient in-focus range. Also, the focal length of the RFC will become longer and therefore, to secure a predetermined magnification during short distance photography, the amount of movement for focusing will become remarkably great. If the upper limit of condition (1) is exceeded, the negative refractive power of the RFC will become excessively great and therefore, correction of aberrations will become difficult while, at the same time, the number of necessary lenses will increase and further, the F-number will become greater and the lens will become dark, thus reducing the focusing accuracy.

Condition (2) is substantially concerned with the focusing capability of the RFC and prescribes the range of movement and the power distribution of the RFC for enabling the focusing to objects at infinity to a practically sufficient short distance. If this condition is departed from, the negative refractive power of the RFC will become too great and Petzval sum will become great in the negative sense, whereby astigmatic difference will be enlarged and further, correction of spherical aberration will also become difficult and it will be impossible to maintain an excellent imaging performance.

In the basic construction of the present invention as described above, it is desirable that the following conditions be satisfied:

$$0.17 < \frac{\Sigma d}{\beta \cdot MB} < 0.25 \quad (3)$$

$$0.6 < \frac{B_f}{-d_0 \cdot \beta} < 0.85 \quad (4)$$

where $\Sigma d$ is the distance from the foremost lens surface of the RFC to the last lens surface, $B_f$ is the back focal length of the RFC during infinity in-focus, $d_0$ is the object point distance of the RFC, namely, the distance between the image point of the mounted objective lens and the foremost lens surface of the RFC, and MB is the flange back of the single lens reflex camera body.

If the lower limit of condition (3) is exceeded, it will be difficult to obtain a bright RFC of high performance while securing the edge thickness of the lens sufficiently. Particularly, the degree of freedom of aberration correction will be decreased by the thinning of the lens and the reduced number of lenses, and correction of annular spherical aberration and astigmatic difference will be difficult. If the upper limit of condition (3) is exceeded, it will become difficult to sufficiently secure the back focal length necessary for the single lens reflex camera body, and this is undesirable.

If the lower limit of condition (4) is exceeded, the back focal length will become shorter and the versatility of the RFC will be remarkably reduced. Particularly, when the RFC is mounted on an objective lens of short back focal length, a sufficient in-focus range cannot be secured. If the upper limit of condition (4) is exceeded, the versatility will be increased, but the edge thickness and air space of the lens will be made remarkably small and therefore, it will become difficult to secure a sufficient optical performance, and this is undesirable as in the case where the lower limit of condition (3) is exceeded.

Figure 2A:
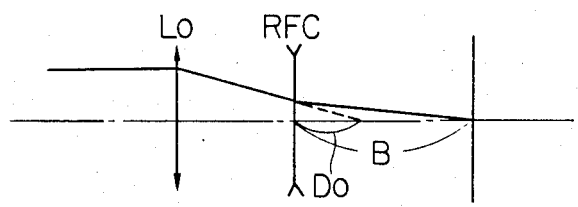
FIGS. 2A and 2B are geometro-optic construction views of the rear focus conversion lens according to the present invention when mounted to a certain objective lens, FIG. 2A showing the infinity in-focus and FIG. 2B showing the short distance in-focus.
Figure 2B:
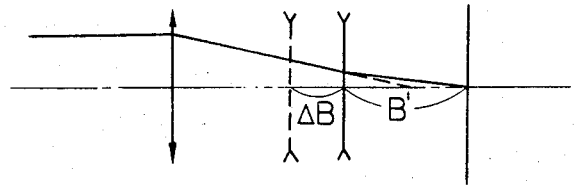

The magnification achieved by the RFC will now be described. FIG. 2 shows the geometro-optic construction when the RFC according to the present invention is mounted on a certain objective lens $L_0$. FIG. 2A shows the time of infinity in-focus and FIG. 2B shows the time of short distance in-focus. During infinity in-focus, when the distance from the principal point of the RFC to the object point (the image point of the objective lens $L_0$) is $D_0 (<0)$ and the back focal length is B, the magnification $\beta(>1)$ is $$\beta = -\frac{B}{D_0}.$$

Also, assuming that the back focal length has become B' when the RFC has been moved toward the image side by $\Delta B (>0)$ and focused to the short distance, the magnification $\beta'$ of the RFC in this short distance in-focus state, with $f_R$ as the focal length of the RFC, is $$\beta' = -\frac{B' - f_R}{f_R} = 1 - \frac{B - \Delta B}{f_R}.$$

From the previous equation, $B = -\beta D_0$ and hence, $$\beta' = 1 + \frac{\beta D_0 + \Delta B}{f_R}.$$

Accordingly, in the RFC according to the present invention, if $\beta$, $f_R$ and $D_0$ are determined by the specification as a popular rear conversion lens in the infinity in-focus state, the magnification $\beta'$ in the short distance in-focus state in which the RFC has been moved by $\Delta B$ will be primarily determined as shown by the foregoing equation.

As a specific lens construction of the first RFC according to the present invention, it is desirable that as shown, for example, in FIG. 5 which shows a first embodiment, a forward group having a positive lens $L_1$ having its surface of sharper curvature facing the image side, a biconcave negative lens $L_2$ and a positive lens $L_3$ having its surface of sharper curvature facing the object side, and a rearward group having a negative lens $L_4$ having its surface of sharper curvature facing the object side, and a positive lens $L_5$ having its surface of sharper curvature facing the object side be provided in succession from the object side. The rearward group may also comprise the negative lens $L_4$ alone.

In such a specific lens construction, it is desirable that the following conditions be satisfied:

$$1.5 < \left|\frac{f_1}{f_2}\right| < 3.2 \tag{5}$$

$$1.3 < \left|\frac{f_3}{f_2}\right| < 3.2 \tag{6}$$

where $f_1$ is the focal length of the positive lens $L_1$ as a first component in the forward group, $f_2$ is the focal length of the negative lens $L_2$ as a second component in the forward group, and $f_3$ is the focal length of the positive lens $L_3$ as a third component in the forward group.

Conditions (5) and (6) prescribe the appropriate power distribution in the forward group of the RFC. If the lower limits of conditions (5) and (6) are exceeded, the positive power will become relatively strong and spherical aberration will be greatly under-corrected. If upper limits of these conditions are exceeded, the negative power will become relatively strong and the Petzval sum will become excessively great in the negative sense and correction of astigmatism and astigmatic difference will become difficult.

Further, if glass of remarkably high refractive index is used for the negative lens components $L_2$ and $L_4$ in the RFC, the on-axis and off-axis chromatic aberrations of astigmatism and annular spherical aberration can be corrected better. Particularly, it is desirable that the following conditions be satisfied:

$$n_- > 1.82 \tag{7}$$

$$\nu_- > 35 \tag{8}$$

where $n_-$ is the highest refractive index of the negative lens components in the RFC and $\nu_-$ is the lowest Abbe number of the negative lens components in the RFC.

Condition (7) is a condition desirable to correct the Petzval sum and astigmatism and can sufficiently correct annular spherical aberration which tends to occur in the negative lens components when made to have a great aperture ratio and made thin. If lenses departing from conditions (7) and (8) are used as the negative lens components, correction of annular spherical aberration, Petzval sum, astigmatism and on-axis chromatic aberration will become difficult. It is desirable that high dispersion glass of low refractive index below the refractive index 1.65 and of Abbe number 40 or lower be used for the positive lens components in the forward group.

Figure 3:
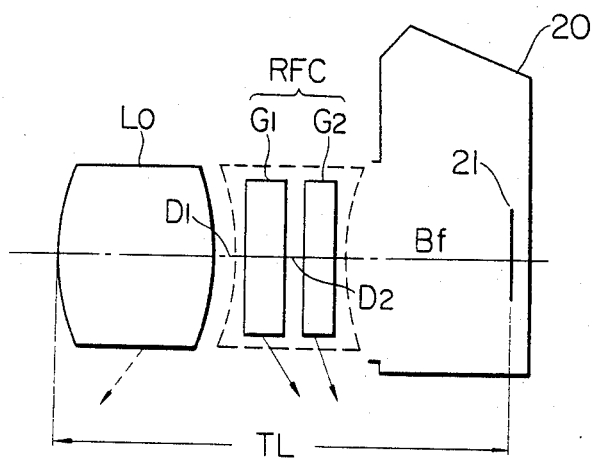
FIG. 3 is a schematic construction view of the composite system in which the rear focus conversion lens according to the present invention has been mounted between the objective lens and the camera body and focused to an infinity object.
Figure 4:
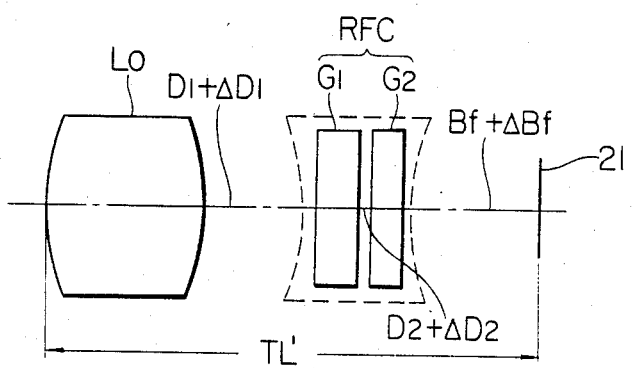
FIG. 4 is a schematic construction view of the composite system in which the rear focus conversion lens has been mounted in the same manner as in FIG. 3 and focused to a finite distance object.

A second RFC according to the present invention, as schematically shown in FIG. 3, is a rear conversion lens removably mounted between an objective lens $L_0$ and a camera body 20 and having a negative refractive power to make the combined focal length of the rear conversion lens and the objective lens greater than the focal length of the objective lens, and has a forward group $G_1$ having a plurality of lenses and a rearward group $G_2$ having at least one lens, the two groups being movable on the optical axis relative to each other during focusing.

Where the enlargement magnification $\beta$ of the RFC is a relatively high magnification, focusing can be sufficiently accomplished by only the relative movement of the forward group $G_1$ and the rearward group $G_2$ of the RFC, but focusing can also be accomplished at a relatively low magnification by adding the movement of the objective lens $L_0$ itself relative to the image plane 21. Now, assuming that the RFC according to the present invention is mounted between the objective lens $L_0$ and the camera body 20, that the full length of the composite system when focused to an infinity object (the distance from the foremost surface of the objective lens to the image plane 21) is TL, that the full length of the composite system when focused to a finite distance object as shown in FIG. 4 is TL', that the spacing $D_1$ between the objective lens $L_0$ and the forward group $G_1$ of the RFC has been varied by $\Delta D_1$ from $D_1$ to $D_1 + \Delta D_1$, that the spacing $D_2$ between the forward group $G_1$ of the RFC and the rearward group $G_2$ of the RFC has been varied by $\Delta D_2$ from $D_2$ to $D_2 + \Delta D_2$ and that the back focal length $B_f$ of the composite system has been varied to $B_f + \Delta B_f$, the amount of variation $\Delta TL$ in the full length is expressed as $\Delta TL = TL' - TL = \Delta D_1 + \Delta D_2 + \Delta B_f$.

Here, the coefficient value $\alpha$ obtained by dividing the amount of variation $\Delta TL$ in the full length by the amount of variation $\Delta B_f$ in the back focal length of the composite system is $$\alpha = \Delta TL/\Delta B_f = \Delta D_1/\Delta B_f + \Delta D_2/\Delta B_f.$$

If $$\begin{cases} \alpha_1 = \Delta D_1/\Delta B_f \\ \alpha_2 = \Delta D_2/\Delta B_f, \end{cases}$$

then $$\alpha = \alpha_1 + \alpha_2 + 1 \tag{I}$$

and $\alpha_1$ and $\alpha_2$ are the rates of variation of the amount of variation $\Delta D_1$ in the spacing between the objective lens $L_0$ and the forward group $G_1$ of the RFC and the amount of variation $\Delta D_2$ in the spacing between the forward group G and the rearward group $G_2$ of the RFC, respectively, relative to the amount of variation $\Delta B_f$ in the back focal length of the composite system.

By the above equation (I), the cases except the case where the back focal length of the composite system is not varied, that is, all of the cases where $\Delta B_f \neq 0$, can be represented with respect to the form of movement regarding the RFC of the present invention. For example, when $\alpha = 0$, it means that the objective lens is fixed relative to the image plane and focusing is effected only by the RFC. However, when $\alpha = 0$ and $\alpha_1 = -1$ and $\alpha_2 = 0$, it means the focusing system in which the forward and rearward groups $G_1$ and $G_2$ of the RFC are moved together, namely, the focusing system of the aforementioned first RFC. When $\alpha_1 = \alpha_2 = 0$ and $\alpha = 1$, it means the focusing system in which the entire composite system is moved as a unit.

Now, in case $\Delta B_f = 0$, that is, in the case of the focusing system in which the back focal length of the composite system is not varied, it is represented by a coefficient value $\gamma$ obtained by dividing the amount of variation $\Delta TL$ in the full length by the amount of variation $\Delta D_1$ in the spacing between the objective lens $L_0$ and the forward group $G_1$ of the RFC. That is, if $$\gamma = \Delta TL/\Delta D_1 = 1 + \Delta D_2/\Delta D_1 + \Delta B_f/\Delta D_1$$

and $$\begin{cases} \gamma_1 = \Delta D_2/\Delta D_1 \\ \gamma_2 = \Delta B_f/\Delta D_1, \end{cases}$$

then $$\gamma = 1 + \gamma_1 + \gamma_2 \quad \text{(II)}$$

$\gamma_1$ and $\gamma_2$ are the rates of variation of the amount of variation $\Delta D_2$ in the spacing between the forward group $G_1$ and the rearward group $G_2$ of the RFC and the amount of variation $\Delta B_f$ in the back focal length of the composite system, respectively, relative to the amount of variation $\Delta D_1$ in the spacing between the objective lens and the forward group $G_1$ of the RFC. Again, when $\gamma_1 = \gamma_2 = 0$ and $\gamma = 1$, it means the focusing system in which the entire composite system is moved as a unit.

As a result of the various studies made of the RFC of the present invention by the coefficient value $\alpha$ or $\gamma$ based on equation (I) or (II) above, it has been found that if $$-0.2 < \alpha < 2.5 \quad \text{(9)}$$

is satisfied when $\Delta B_f \neq 0$ and $$-0.2 < \gamma < 2.5 \quad \text{(10)}$$

is satisfied when $\Delta D_1 \neq 0$, there can be obtained an excellent RFC best suited for the objects of the present invention.

That is, by constructing the RFC by dividing it into two forward and rearward groups and moving the two groups relative to each other to thereby effect focusing, the aberration fluctuation occurring when the RFC is focused to a short distance object can be offset, whereby deterioration of the optical performance can be prevented even if the very short distance is made still shorter, that is, even if the photographic magnification is made greater. Moreover, the refractive powers of the two groups become stronger than the refractive power of the entire RFC and therefore, the amount of movement for focusing can be made smaller than the amount of movement when there is no relative movement of the two groups and focusing is accomplished by integral movement. Therefore, the tendency that the back focal length becomes smaller during short distance focusing can be diminished and focusing to shorter distances becomes possible.

If the lower limits of conditions (9) and (10) are exceeded, the full length TL' during short distance focusing will become smaller than the full length TL during infinity focusing and therefore, the length of the optical path will become shorter and various aberrations will become liable to occur and particularly, sagittal astigmatism will become excessively great in the positive sense in short distance condition and thus, correction of various aberrations at short distances will become insufficient. If the upper limits of conditions (9) and (10) are exceeded, the full length of the composite system will become suddenly longer during focusing and the lens barrel of the RFC will have to be extended greatly and, since the RFC is relatively short in the length between the foremost lens surface thereof and the last lens surface thereof, it will become difficult in mechanism to hold the objective lens relative to the RFC with the axial deviation and fall being reduced, and this is disadvantageous to maintaining an excellent imaging performance over the entire range of focusing even if a lens construction which will permit a certain degree of eccentricity is devised.

The focusing system which cannot be defined by any of conditions (9) and (10) is a system in which focusing is accomplished by $\Delta B_f = \Delta D_1 = 0$, that is, by varying the spacing between the forward and rearward groups of the RFC. In this focusing system, if the fluctuation of spherical aberration is checked, the variations in astigmatism and coma will become vehement and therefore, spherical aberration will not fluctuate so much and the system may be divided into forward and rearward groups at an air space in which there is a fluctuation of astigmatism and coma and the design may be such that this air space is varied. For that purpose, it is desirable to fluctuate the air space of the lens near the image plane as far as possible.

It is desirable that the enlargement magnification $\beta$ borne by the second RFC of the present invention during infinity focusing, like the aforedescribed first RFC, be $1.3 < \beta < 2.5$.

Further, it is desirable with respect to the second RFC that when the focal length of the RFC is $f_R$ and the focal length of the rearward group $G_2$ of the RFC is $F_2$, the following condition be satisfied:

$$0.6 < |F_2/f_R| < 1.3 \quad \text{(11)}$$

This condition prescribes the power distributions to the forward and rearward groups in the RFC. If the lower limit of this condition is exceeded, the forward and rearward groups of the RFC will be divided as lens groups having strong refractive powers and the aberration fluctuation will become vehement due to the variation in the spacing between the two groups, and this is not desirable. Also, if the lower limit of this condition is exceeded, the rearward group $G_2$ will bear a strong refractive power and therefore, the RFC will have to be constituted by a plurality of lenses and as a result, the variable air space separating the forward group and the rearward group of the RFC will become distant from the image plane, and spherical aberration and astigmatism will fluctuate at the same time, and this is not desirable in the RFC in which correction of astigmatism at short distances is necessary. If the upper limit of this condition is exceeded, the refractive power of the rearward group $G_2$ of the RFC will become weak and therefore, the correction of astigmatism during short distance focusing by relative movement of the forward and rearward groups will become insufficient, and this is undesirable.

In the basic construction of the second RFC according to the present invention as described above, the RFC as a whole has a negative refractive power and yet the forward group $G_1$ has chiefly a negative refractive power and the rearward group $G_2$ has a positive or negative refractive power. However, where the negative refractive power of the rearward group is great, the forward group may be made to have a positive refractive power. In any case, an appropriate combination is selected within the range of each said condition. It is desirable that the forward group $G_1$ comprise at least three lenses including at least one negative lens and at least one positive lens, and that the rearward group $G_2$ comprise chiefly a single positive lens or a single negative lens but alternatively, it may comprise a plurality of lenses in accordance with the aberration balance in the forward and rearward groups.

Figure 5A:
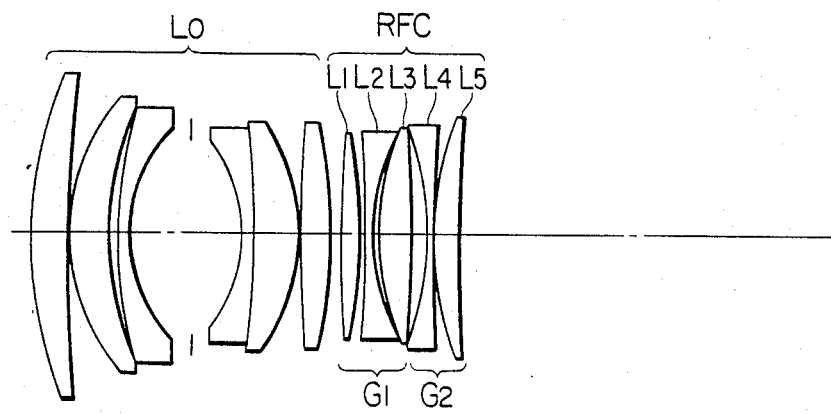
FIGS. 5A and 5B show a first embodiment of the rear focus conversion lens of the present invention and illustrate the positional relation between a standard objective lens and the rear focus conversion lens, FIG. 5A showing the infinity in-focus state and FIG. 5B showing the short distance in-focus state.
Figure 5B:
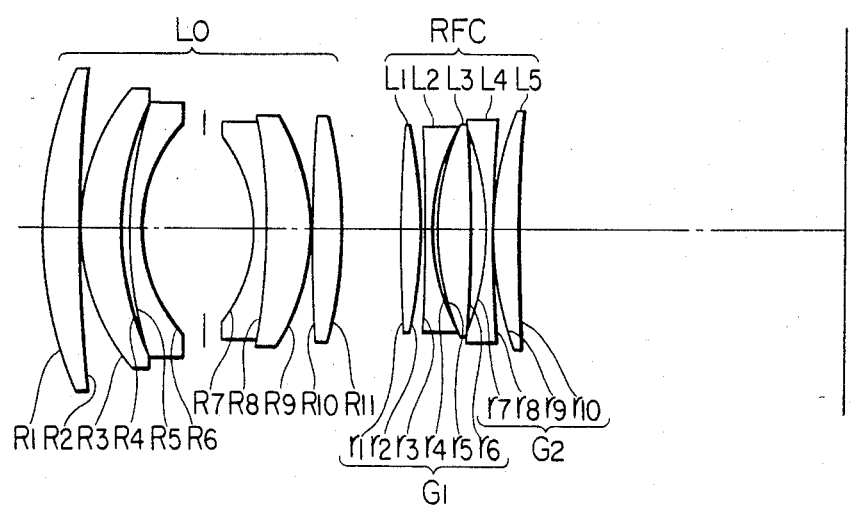
Figure 8:
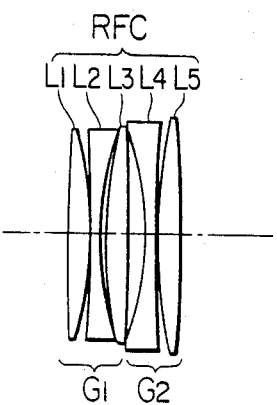
FIGS. 8, 11 and 14 show second, third and fourth embodiments, respectively, of the present invention.

Embodiments of the RFC according to the present invention will hereinafter be shown. Each embodiment has been designed with the objective lens shown in Table 1 as the standard. This standard objective lens is described in Japanese Laid-open Patent Application No. 88020/1977 (corresponding to U.S. Pat. No. 4,139,265) assigned to the same assignee as the assignee of the present invention. Of the following twelve embodiments, first to fourth embodiments correspond to the first RFC according to the present invention and fifth to twelfth embodiments correspond to the second RFC according to the present invention. The first and second embodiments, as shown in the lens construction views of FIGS. 5A and 5B and 8, comprise constructions similar to what has been previously described. However, in the first embodiment, the positive lens $L_5$ in the rearward group is a positive meniscus lens having its convex surface facing the object side, whereas in the second embodiment, it is a biconvex lens. FIGS. 5A and 5B show the positional relation between the standard objective lens $L_0$ and the RFC, FIG. 5A showing the infinity in-focus state and FIG. 5B showing the short distance in-focus state. The numerical data of the first and second embodiments will be shown in Tables 2 and 3 below.

Figure 11:
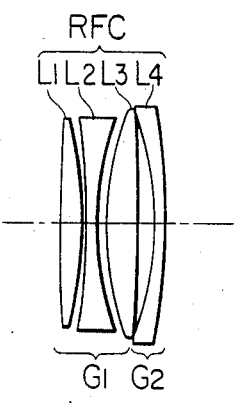
Figure 14:
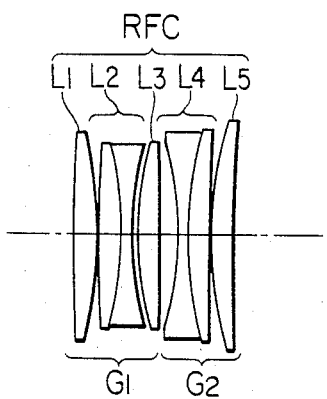

In the third embodiment of the present invention, as shown in the lens construction view of FIG. 11, the rearward group is comprised of only a negative meniscus lens $L_4$ having its convex surface facing the image side. In the fourth embodiment, as shown in the lens construction view of FIG. 14, the negative lens $L_2$ in the forward group and the negative lens $L_4$ in the rearward group are respectively constituted by cemented lenses and the Petzval sum and chromatic aberration are corrected more easily. The numerical data of the third and fourth embodiments will be shown in Tables 4 and 5, respectively. In each table, R and r represent the radius of curvature of each lens surface, D and d represent the center thickness and air space of each lens, n represents the refractive index for the d-line ($\gamma=587.6$ nm), $\nu$ represents the Abbe number, and subscript numbers represent the order from the object side. Also, in each table, $d_0$ represents the distance between the image point by the objective lens and the foremost lens surface of the RFC, F represents the combined focal length of the RFC of each embodiment when combined with the standard objective lens of Table 1, M represents the combined photographing magnification, $D_m$ represents the distance from the foremost lens surface of the objective lens to the object, $D_c$ represents the air space during the infinity in-focus of the standard objective lens and the RFC, $B_f$ represents the back focal length of the composite system of the objective lens and the RFC, $\Delta B_f$ represents the amount of variation in the back focal length, $\beta$ represents the magnification of the RFC, $f_R$ represents the focal length of the RFC, $\Sigma d$ represents the distance from the foremost lens surface of the RFC to the last lens surface thereof, and $f_1$, $f_2$ and $f_3$ represent the focal lengths of the first, second and third components $L_1$, $L_2$ and $L_3$, respectively, in the forward group of the RFC.

TABLE 1

(Standard Objective Lens)

Focal length: f = 51.6  F number 1.8
Angle of view: $2\omega = 46°$

| | | | |
|---|---|---|---|
| $R_1 = 41.000$ | $D_1 = 4.6$ | $n_1 = 1.79631$ | $\nu_1 = 40.8$ |
| $R_2 = 197.900$ | $D_2 = 0.1$ | | |
| $R_3 = 21.400$ | $D_3 = 4.7$ | $n_2 = 1.78797$ | $\nu_2 = 47.5$ |
| $R_4 = 32.600$ | $D_4 = 1.0$ | | |
| $R_5 = 51.000$ | $D_5 = 1.1$ | $n_3 = 1.74000$ | $\nu_3 = 28.2$ |
| $R_6 = 16.200$ | $D_6 = 13.1$ | | |
| $R_7 = -16.500$ | $D_7 = 1.3$ | $n_4 = 1.74000$ | $\nu_4 = 28.2$ |
| $R_8 = -100.000$ | $D_8 = 5.4$ | $n_5 = 1.74443$ | $\nu_5 = 49.4$ |
| $R_9 = -20.640$ | $D_9 = 0.1$ | | |
| $R_{10} = 204.300$ | $D_{10} = 3.45$ | $n_6 = 1.79631$ | $\nu_6 = 40.8$ |
| $R_{11} = -49.652$ | Back focal length: 37.6054 | | |

TABLE 2

(First Embodiment)

$\beta = 1.60$  $f_R = -75.3339$
$d_0 = -36.6054$

| | | | | |
|---|---|---|---|---|
| $r_1 = 133.317$ | $d_1 = 2.5$ | $n_1 = 1.59507$ | $\nu_1 = 35.5$ | $L_1$ |
| $r_2 = -51.168$ | $d_2 = 0.5$ | | | |
| $r_3 = -190.874$ | $d_3 = 1.0$ | $n_2 = 1.84042$ | $\nu_2 = 43.3$ | $L_2$ |
| $r_4 = 24.064$ | $d_4 = 0.5$ | | | |
| $r_5 = 27.743$ | $d_5 = 4.0$ | $n_3 = 1.59507$ | $\nu_3 = 35.5$ | $L_3$ |
| $r_6 = -109.951$ | $d_6 = 1.5$ | | | |
| $r_7 = -31.481$ | $d_7 = 1.0$ | $n_4 = 1.84042$ | $\nu_4 = 43.3$ | $L_4$ |
| $r_8 = 2846.347$ | $d_8 = 0.1$ | | | |
| $r_9 = 37.218$ | $d_9 = 2.5$ | $n_5 = 1.51118$ | $\nu_5 = 50.9$ | $L_5$ |
| $r_{10} = 115.703$ | | | | |

| F or M | 82.5596 | −0.100 |
|---|---|---|
| $D_m$ | ∞ | 810.4909 |
| $D_c$ | 1.0 | 6.7412 |
| $B_f$ | 44.0080 | 38.2668 |

$\Sigma d = 13.6$  $f_2 = -25.374$
$f_1 = 62.453$  $f_3 = 37.636$
$\Delta B_f = 5.7412$

TABLE 3

(Second Embodiment)

$\beta = 1.50$  $f_R = -87.2348$
$d_0 = -36.6054$

| | | | | |
|---|---|---|---|---|
| $r_1 = 500.000$ | $d_1 = 2.5$ | $n_1 = 1.59507$ | $\nu_1 = 35.5$ | $L_1$ |
| $r_2 = -45.149$ | $d_2 = 0.2$ | | | |
| $r_3 = -325.888$ | $d_3 = 1.0$ | $n_2 = 1.84042$ | $\nu_2 = 43.3$ | $L_2$ |
| $r_4 = 33.269$ | $d_4 = 0.5$ | | | |
| $r_5 = 39.693$ | $d_5 = 3.0$ | $n_3 = 1.59507$ | $\nu_3 = 35.5$ | $L_3$ |
| $r_6 = -132.889$ | $d_6 = 2.2$ | | | |
| $r_7 = -28.526$ | $d_7 = 1.0$ | $n_4 = 1.84042$ | $\nu_4 = 43.3$ | $L_4$ |
| $r_8 = 339.137$ | $d_8 = 0.2$ | | | |
| $r_9 = 57.000$ | $d_9 = 2.6$ | $n_5 = 1.54814$ | $\nu_5 = 45.9$ | $L_5$ |
| $r_{10} = -137.274$ | | | | |

| F or M | 77.4002 | −0.0667 |
|---|---|---|
| $D_m$ | ∞ | 1146.2387 |
| $D_c$ | 1.0 | 5.3935 |
| $B_f$ | 41.6888 | 37.2952 |

$\Sigma d = 13.2$  $f_2 = -35.874$
$f_1 = 69.707$  $f_3 = 51.697$
$\Delta B_f = 4.3936$

TABLE 4

(Third Embodiment)

$\beta = 1.4142$  $f_R = -96.9405$
$d_0 = -36.6054$

| | | | | |
|---|---|---|---|---|
| $r_1 = 500.000$ | $d_1 = 2.5$ | $n_1 = 1.61293$ | $\nu_1 = 37.0$ | $L_1$ |
| $r_2 = -44.069$ | $d_2 = 0.5$ | | | |

TABLE 4-continued (Third Embodiment)

| | | | | | |
|---|---|---|---|---|---|
| $r_3 = -91.297$ | $d_3 = 1.0$ | $n_2 = 1.84042$ | $\nu_2 = 43.3$ | | $L_2$ |
| $r_4 = 32.578$ | $d_4 = 1.0$ | | | | |
| $r_5 = 29.021$ | $d_5 = 4.0$ | $n_3 = 1.59507$ | $\nu_3 = 35.5$ | | $L_3$ |
| $r_6 = -132.459$ | $d_6 = 2.0$ | | | | |
| $r_7 = -30.959$ | $d_7 = 1.0$ | $n_4 = 1.87739$ | $\nu_4 = 38.1$ | | $L_4$ |
| $r_8 = -72.603$ | | | | | |

| F or M | 72.9734 | −0.0333 |
|---|---|---|
| $D_m$ | ∞ | 2173.0891 |
| $D_c$ | 1.0 | 3.5255 |
| $B_f$ | 39.7209 | 37.1952 |

$\Sigma d = 12.0$    $f_2 = -28.464$
$f_1 = 66.191$    $f_3 = 40.377$
            $\Delta B_f = 2.5257$

TABLE 5

(Fourth Embodiment)

$\beta = 1.8340$    $f_R = -57.1288$
$d_0 = -36.1054$

| | | | | | |
|---|---|---|---|---|---|
| $r_1 = 1947.195$ | $d_1 = 2.5$ | $n_1 = 1.59507$ | $\nu_1 = 35.5$ | | $L_1$ |
| $r_2 = -45.857$ | $d_2 = 0.2$ | | | | |
| $r_3 = 169.434$ | $d_3 = 3.0$ | $n_2 = 1.59507$ | $\nu_2 = 35.5$ | $\Big\}L_2$ | |
| $r_4 = -31.215$ | $d_4 = 1.0$ | $n_3 = 1.84042$ | $\nu_3 = 43.3$ | | |
| $r_5 = 33.579$ | $d_5 = 1.0$ | | | | |
| $r_6 = 38.359$ | $d_6 = 2.5$ | $n_4 = 1.59507$ | $\nu_4 = 35.5$ | | $L_3$ |
| $r_7 = -227.416$ | $d_7 = 2.0$ | | | | |
| $r_8 = -34.862$ | $d_8 = 1.0$ | $n_5 = 1.84042$ | $\nu_5 = 43.3$ | $\Big\}L_4$ | |
| $r_9 = 40.000$ | $d_9 = 2.5$ | $n_6 = 1.59507$ | $\nu_6 = 35.5$ | | |
| $r_{10} = 420.996$ | $d_{10} = 0.2$ | | | | |
| $r_{11} = 38.280$ | $d_{11} = 2.5$ | $n_7 = 1.46450$ | $\nu_7 = 65.8$ | | $L_5$ |
| $r_{12} = 246.419$ | | | | | |

| F or M | 94.6350 | −0.1 |
|---|---|---|
| $D_m$ | ∞ | 932.1935 |
| $D_c$ | 1.5 | 5.7491 |
| $B_f$ | 44.5671 | 40.3180 |

Figure 6:
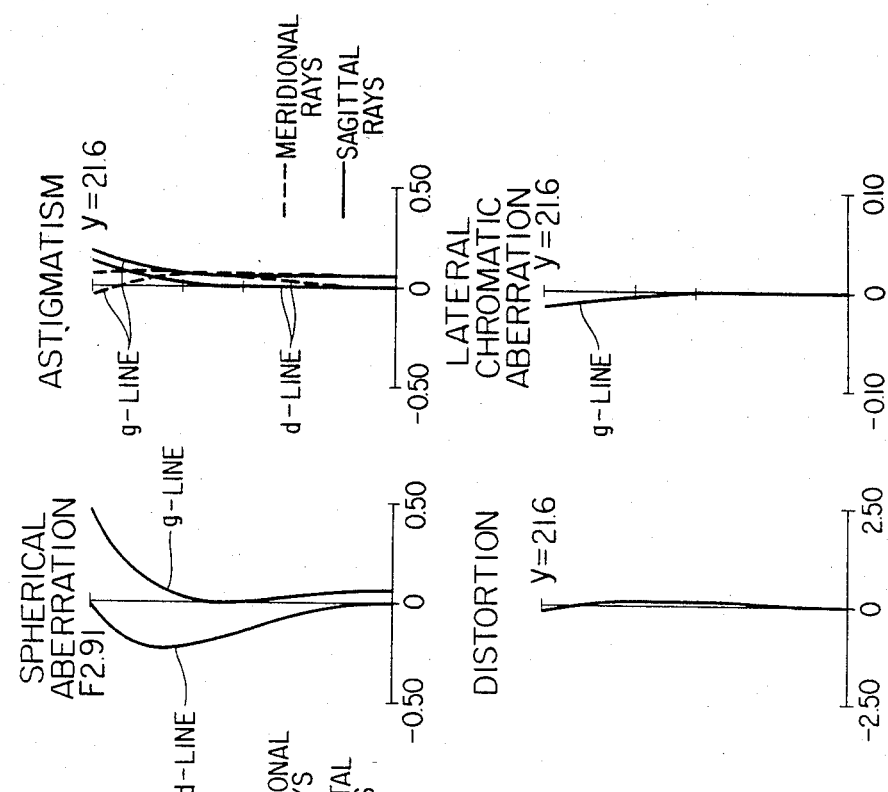
FIGS. 6 and 7 show the various aberrations when the rear focus conversion lens of the first embodiment is mounted to the standard objective lens, FIG. 6 showing the infinity in-focus state and FIG. 7 showing the short distance in-focus state.
Figure 7:
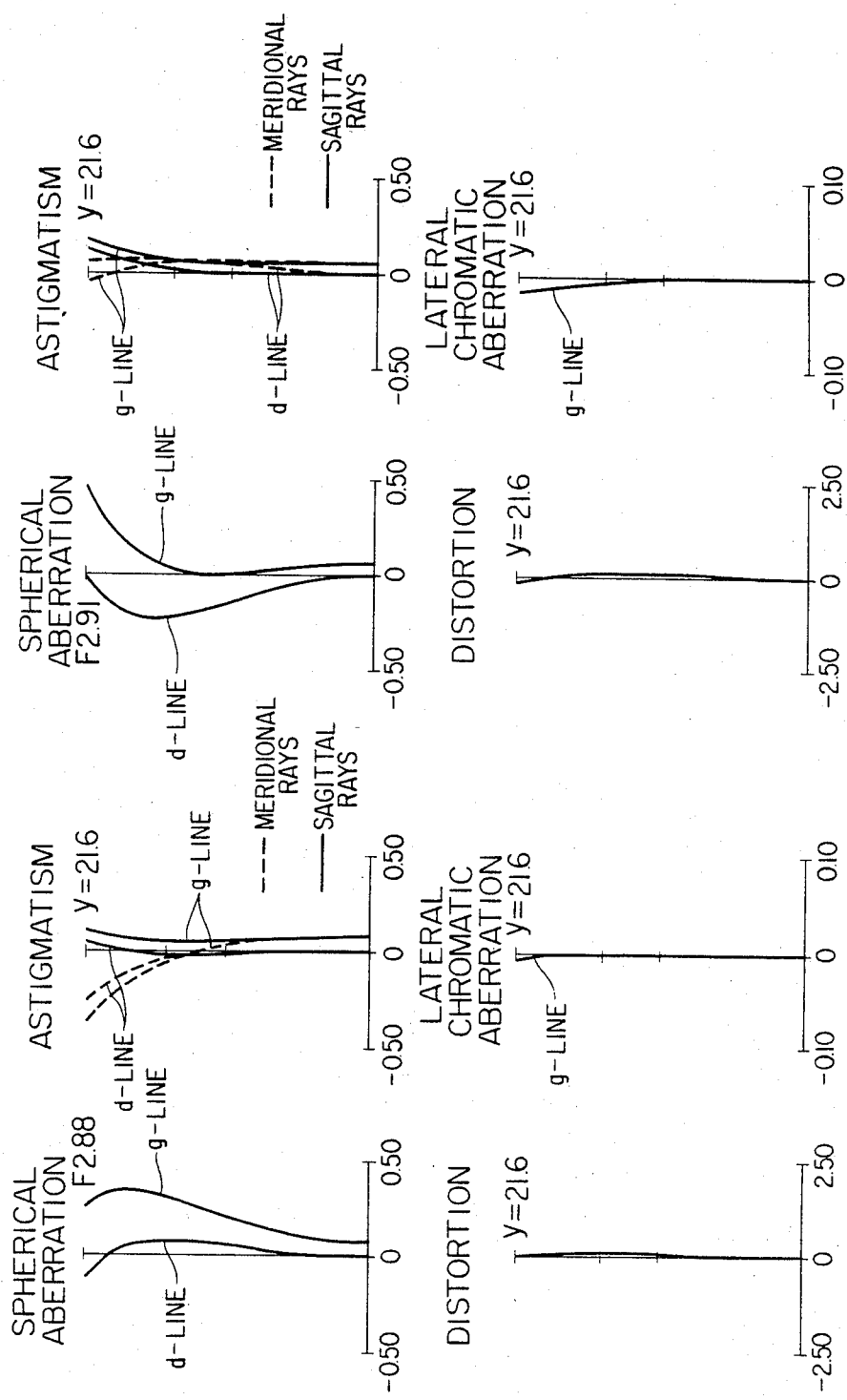
Figures 12, 13:
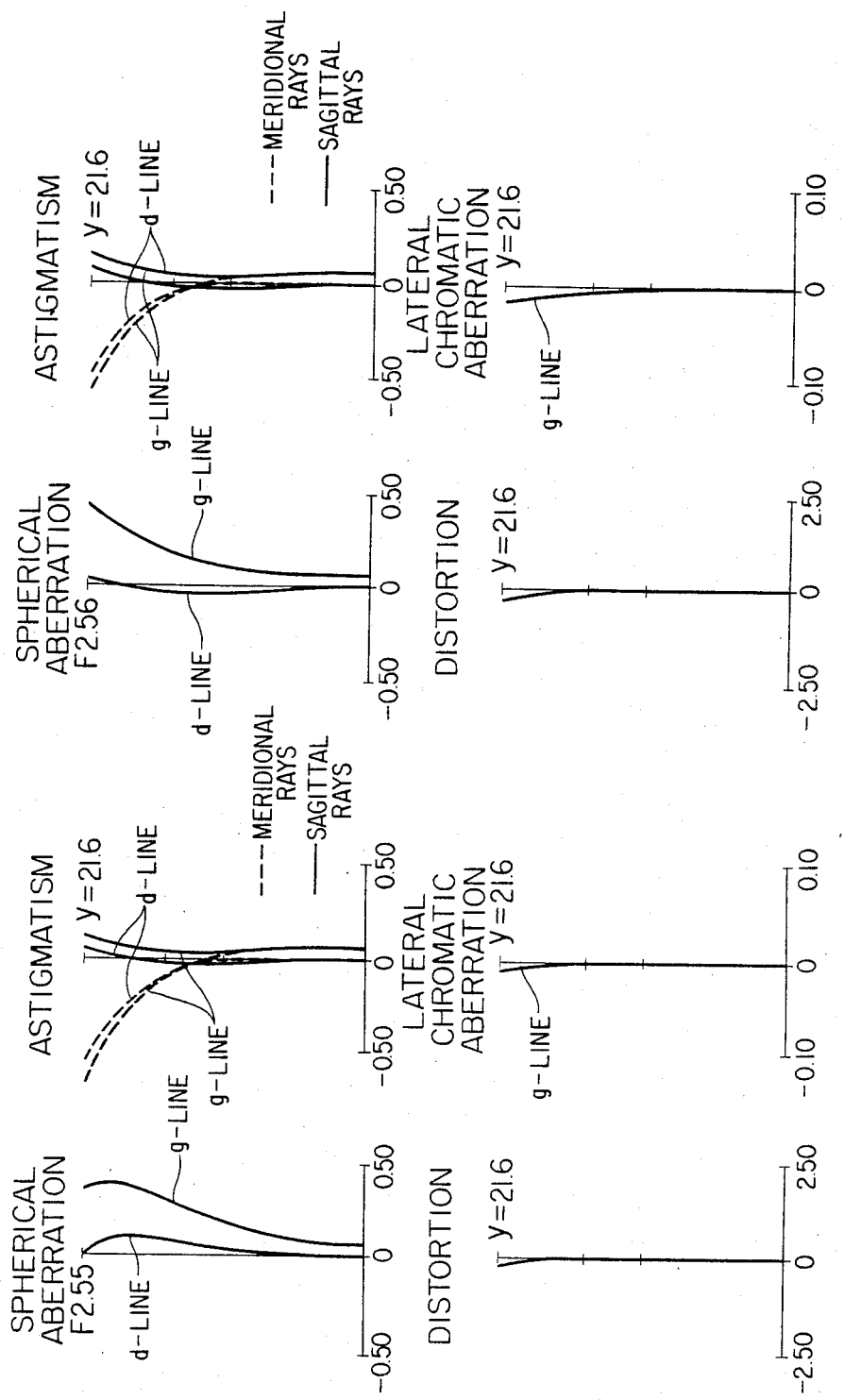
FIG. 12 shows the various aberrations of the third embodiment in the infinity in-focus state.
FIG. 13 shows the various aberrations of the third embodiment in the short distance in-focus state.
Figures 15, 16:
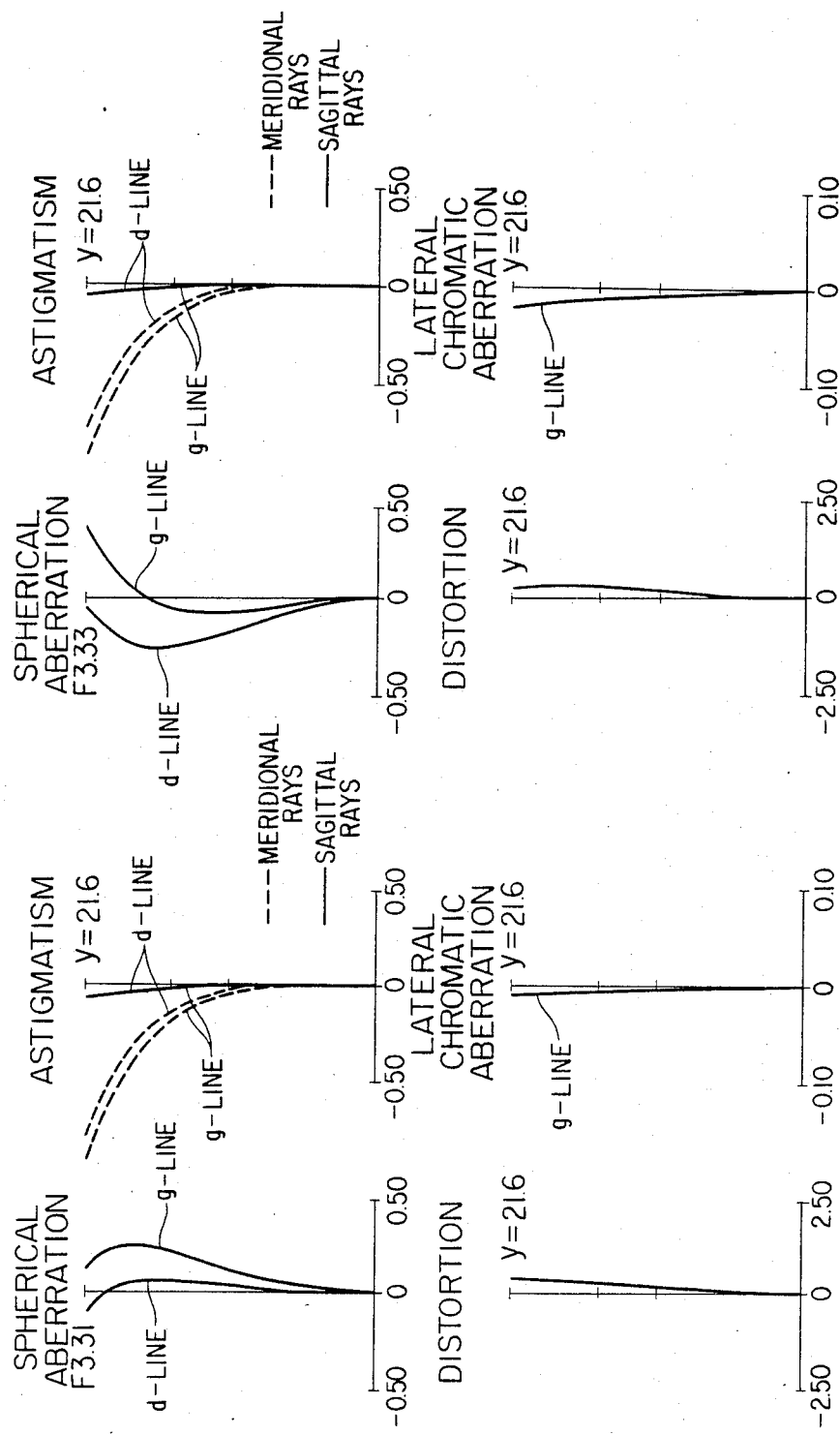
FIG. 15 shows the various aberrations of the fourth embodiment in the infinity in-focus state.
FIG. 16 shows the various aberrations of the fourth embodiment in the short distance in-focus state.

$\Sigma d = 18.4$    $f_2 = -34.226$
$f_1 = 75.324$    $f_3 = 55.352$
            $\Delta B_f = 4.2491$ The various aberrations when the first embodiment is mounted on the standard objective lens of Table 1 are shown in FIGS. 6 and 7. FIG. 6 refers to the infinity in-focus state and FIG. 7 refers to the short distance in-focus state (combined magnification M=0.1). In these aberration graphs, the lateral chromatic aberration is shown for the g-line ($\gamma=435.8$ nm) and for the d-line. The various aberrations in the infinity in-focus state of the second embodiment are shown in FIG. 9, and the various aberrations in the short distance in-focus state (combined magnification M=−0.0667) of the second embodiment are shown in FIG. 10. Likewise, the various aberrations in the infinity in-focus state and the short distance in-focus state (combined magnification M=−0.0333) of the third embodiment are shown in FIGS. 12 and 13, and the various aberrations in the infinity in-focus state and the short distance in-focus state (combined magnification M=−0.1) of the fourth embodiment are shown in FIGS. 15 and 16.

Embodiments of the second RFC according to the present invention will now be described. In the fifth embodiment, the magnification $\beta=1.6$, and the forward group $G_1$ and the rearward group $G_2$ are both moved toward the image side for the short distance focusing, the speed of movement of the forward group being higher than that of the rearward group and the spacing between the two groups being smaller during the short distance focusing than during the infinity focusing.

Figure 17:
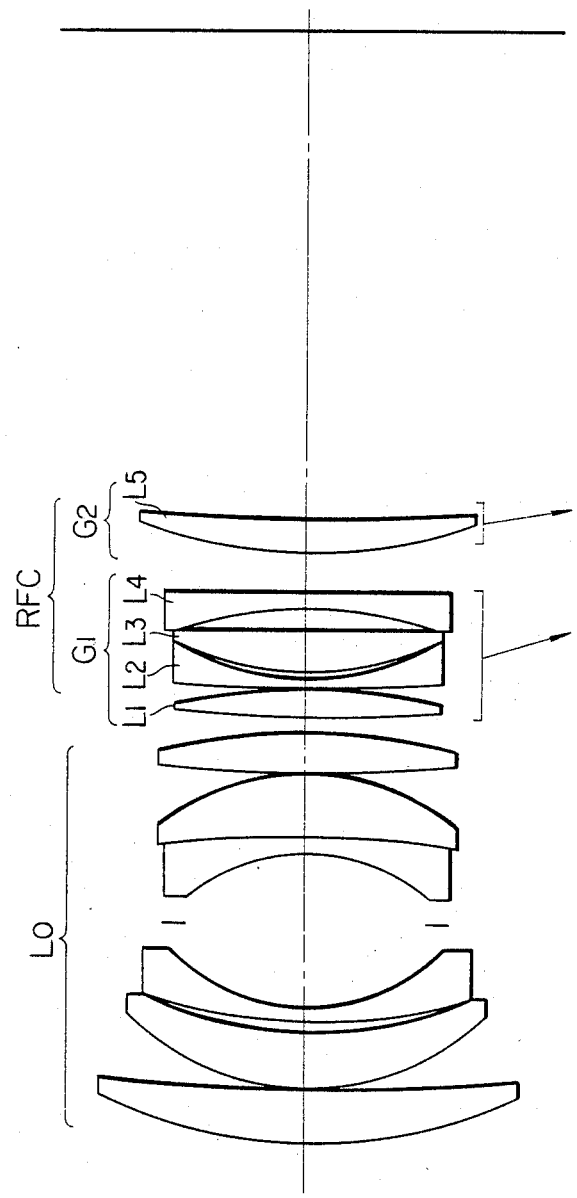
FIG. 17 is a lens construction view in the infinity in-focus state in which the rear focus conversion lens of a fifth embodiment having a magnification of 1.6 is mounted to the standard objective lens.

FIG. 17 is the lens construction view in the infinity in-focus state in which the RFC of the fifth embodiment is mounted on the standard objective lens $L_0$, and the arrows in FIG. 17 indicate the directions of movement of the respective groups for the short distance focusing. As shown, the forward group $G_4$ comprises four components, namely, in succession from the object side, a positive lens $L_1$, a negative lens $L_2$ having its surface of sharper curvature facing the image side, a positive lens $L_3$ having its surface of sharper curvature facing the object side, and a negative lens $L_4$ having its surface of sharper curvature facing the object side, and the rearward group comprises only a single positive lens $L_5$ having its surface of sharper curvature facing the object side. The construction of the sixth embodiment is substantially similar to the construction of the fifth embodiment, but in the sixth embodiment, the magnification is somewhat lower, i.e., $\beta=1.5$.

Figure 23:
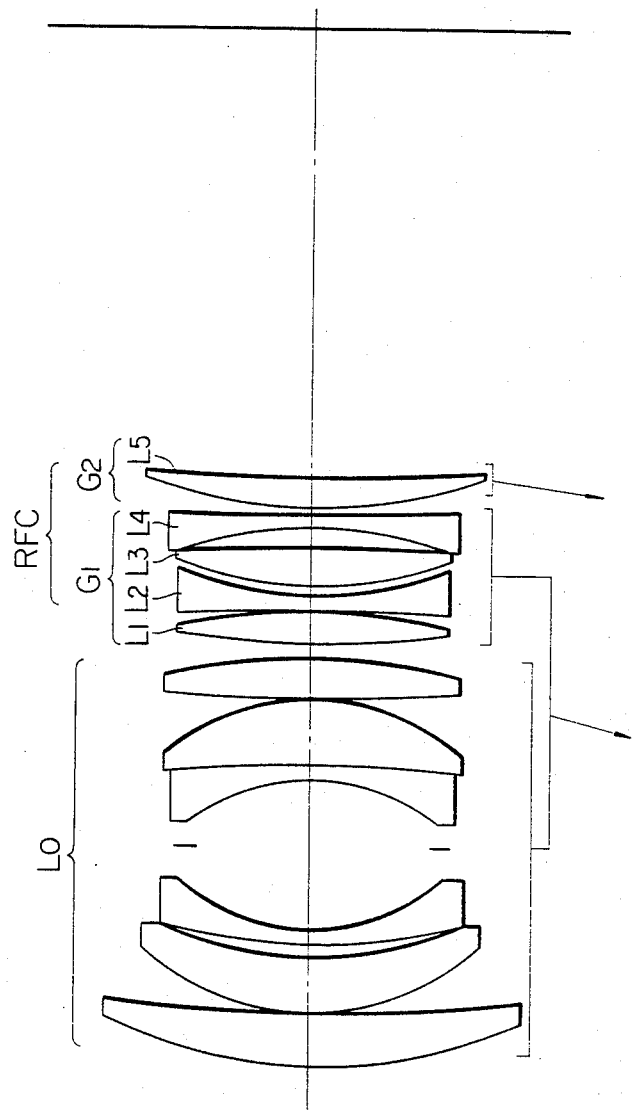
FIG. 23 is a lens construction view in the infinity in-focus state in which the rear focus conversion lens of a seventh embodiment having a magnification of 1.4 is mounted to the standard objective lens.

FIG. 23 shows the lens construction in the infinity in-focus state in which the seventh embodiment is mounted on the standard objective lens $L_0$. In this embodiment, the magnification $\beta=1.4$ and as shown, the forward group $G_1$ and the standard objective lens $L_0$ are moved together toward the object side and the rearward group $G_2$ is moved at a smaller speed in the same direction and the spacing between the two groups becomes greatest at a very short distance. The construction of each group is substantially similar to that in the fifth and sixth embodiments.

Figure 26:
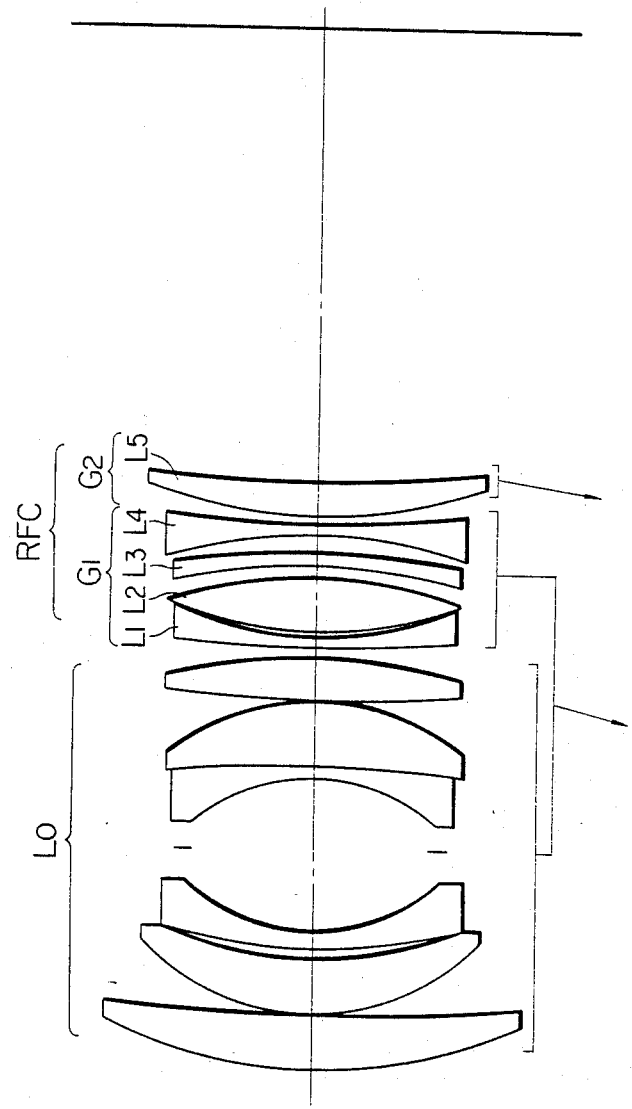
FIG. 26 is a lens construction view in the infinity in-focus state in which the rear focus conversion lens of an eighth embodiment having a magnification of 1.4 is mounted to the standard objective lens.

In the eighth, ninth and tenth embodiments, as in the seventh embodiment, the forward group $G_1$ of the RFC and the standard objective lens are moved together and at the same time, the rearward group $G_2$ is moved at a smaller speed in the same direction and the spacing between the two groups becomes greatest at a very short distance. In any of these three embodiments, the magnification $\beta=1.4$, but the construction of each group differs between these three embodiments. In the eighth embodiment, as shown in FIG. 26, the forward group $G_1$ comprises, in succession from the object side, a negative lens $L_1$ having its surface of sharper curvature facing the image side, a biconvex positive lens $L_2$, a negative meniscus lens $L_3$ having its convex surface facing the image side, and a negative lens $L_4$ having its surface of sharper curvature facing the object side, and the rearward group $G_2$ comprises a positive meniscus lens $L_5$ having its convex surface facing the object side.

Figure 29:
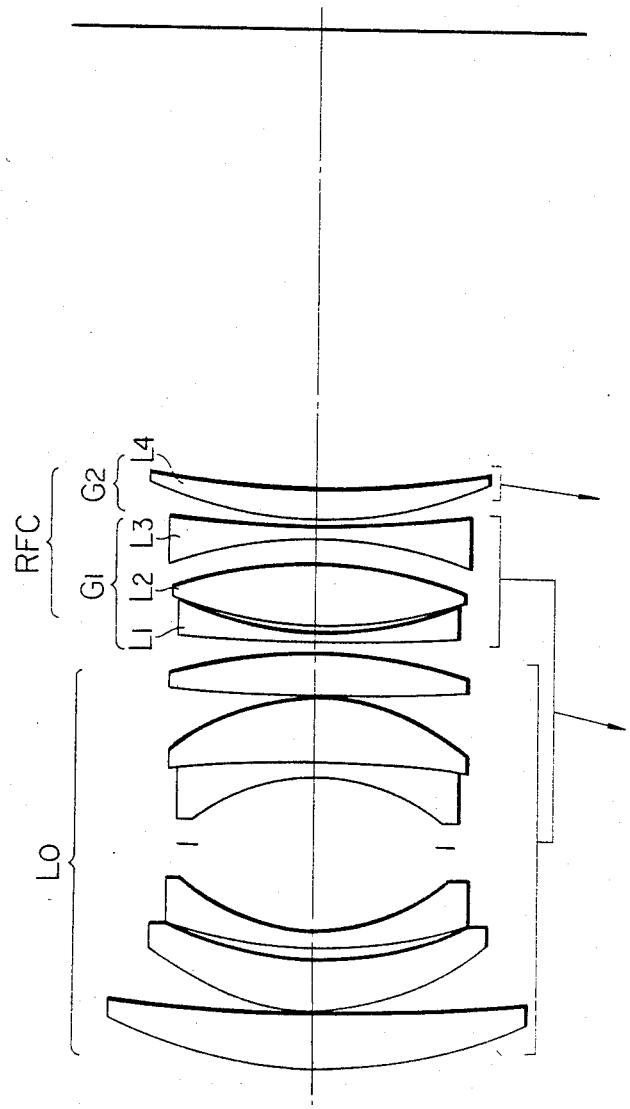
FIG. 29 is a lens construction view in the infinity in-focus state in which the rear focus conversion lens of a ninth embodiment having a magnification of 1.4 is mounted to the standard objective lens.
Figure 32:
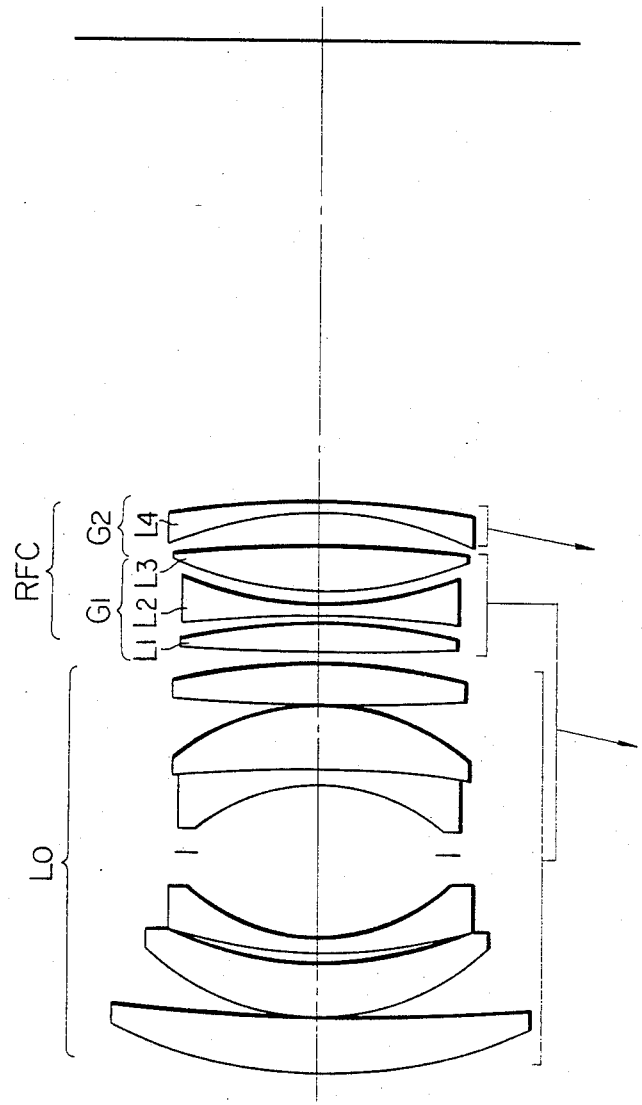
FIG. 32 is a lens construction view in the infinity in-focus state in which the rear focus conversion lens of a tenth embodiment having a magnification of 1.4 is mounted to the standard objective lens.

In the ninth embodiment, as shown in FIG. 29, the forward group $G_1$ comprises, in succession from the object side, a negative lens $L_1$ having its surface of sharper curvature facing the image side, a biconvex positive lens $L_2$, and a negative lens $L_3$ having its surface of sharper curvature facing the object side, and the rearward group $G_2$ comprises a single positive meniscus lens $L_4$ having its convex surface facing the object side. In the tenth embodiment, as shown in FIG. 32, the forward group $G_1$ comprises, in succession from the object side, a positive lens $L_1$ having its surface of sharper curvature facing the image side, a biconcave negative lens $L_2$, and a positive lens $L_3$ having its surface of sharper curvature facing the object side, and has a composite positive refractive power, and the rearward group $G_2$ comprises a negative meniscus lens $L_4$ having its convex surface facing the image side.

Figure 35:
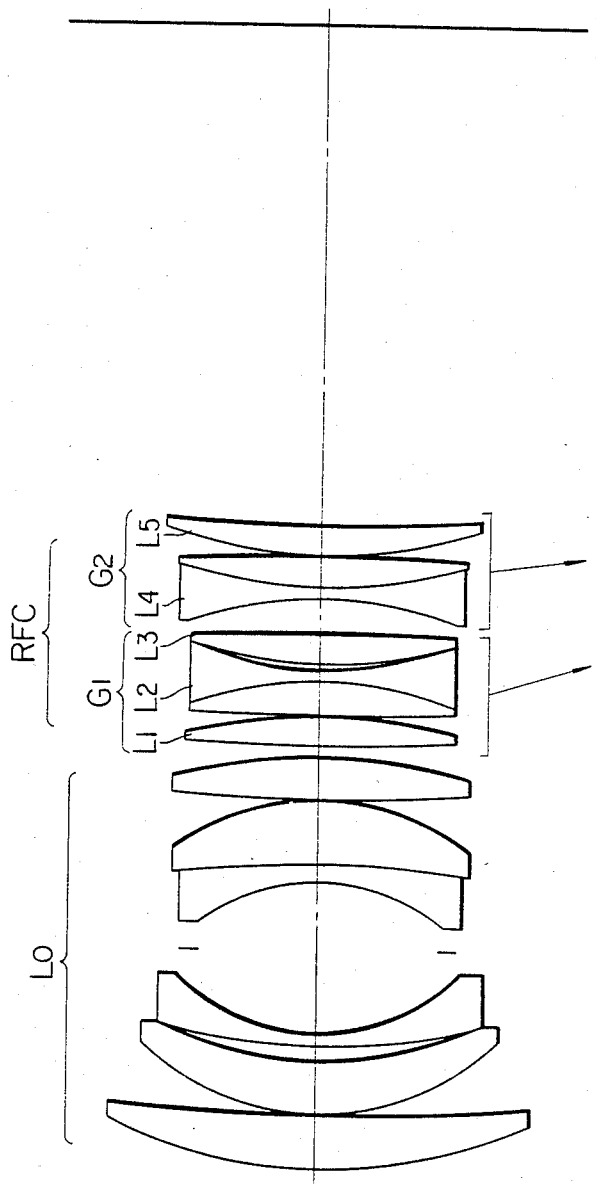
FIG. 35 is a lens construction view in the infinity in-focus state in which the rear focus conversion lens of an eleventh embodiment having a magnification of 1.834 is mounted to the standard objective lens.

In the eleventh embodiment, the magnification is relatively high, i.e., $\beta=1.834$, and focusing is accomplished only by movement of the forward group $G_1$ and the rearward group $G_2$. As shown in FIG. 35, the forward and rearward groups are both moved toward the image side for the short distance focusing, but the movement speed of the forward group $G_1$ is greater than that of the rearward group $G_2$ and the spacing between the two groups becomes smallest during the very short distance focusing and at this time, the spacing between the RFC and the objective lens becomes greatest. The forward group $G_1$ comprises, in succession from the object side, a positive lens $L_1$, a cemented negative lens $L_2$ and a positive lens $L_3$, and has a composite weak positive refractive power, and the rearward group $G_2$ comprises a cemented negative lens $L_4$ and a positive meniscus lens $L_5$ having its convex surface facing the object side, and has a composite negative refractive power.

Figure 38:
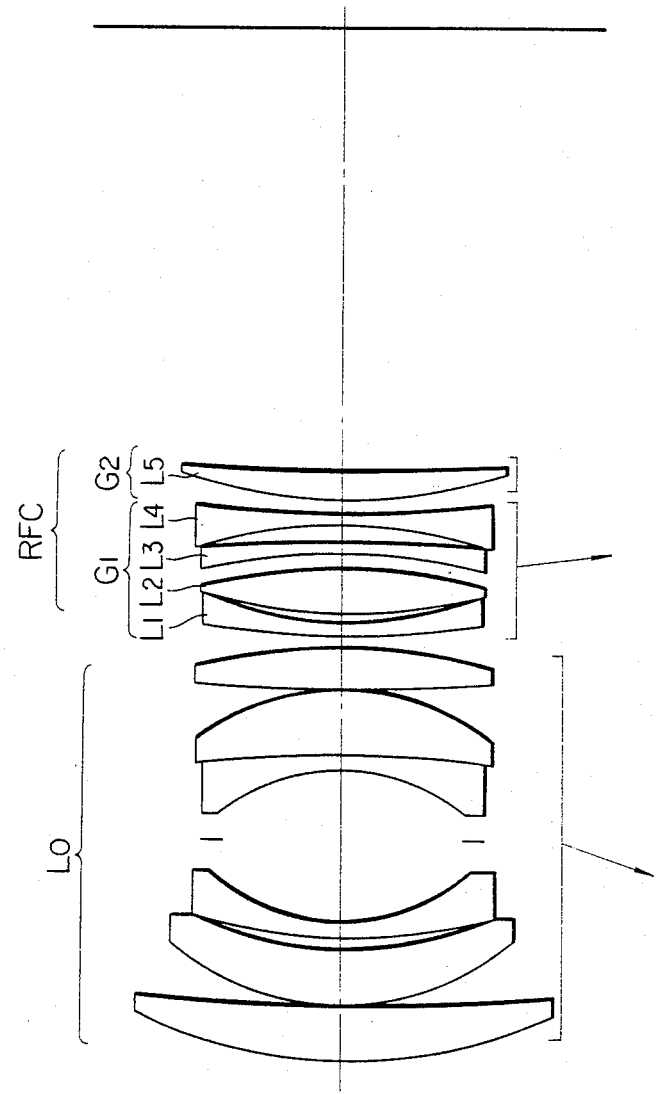
FIG. 38 is a lens construction view in the infinity in-focus state in which the rear focus conversion lens of a twelfth embodiment having a magnification of 1.4 is mounted to the standard objective lens.

In the twelfth embodiment, the magnification $\beta = 1.4$ and the forward group $G_1$ is moved toward the image side for the short distance focusing while, at the same time, the objective lens $L_0$ is moved toward the object side, and the rearward group $G_2$ is fixed. As regards the construction of each group, as shown in FIG. 38, the forward group $G_1$ comprises, in succession from the object side, a negative meniscus lens $L_1$ having its convex surface facing the object side, a biconvex positive lens $L_2$, a negative meniscus lens $L_3$ having its convex surface facing the image side, and a negative lens $L_4$, and the rearward group $G_2$ comprises a positive meniscus lens $L_5$ having its convex surface facing the object side.

As regards the specific construction of each group, where the positive lens is disposed most adjacent to the object side in the forward group, it is particularly advantageous for suppressing the fluctuation of coma at the intermediate angle of view during the short distance focusing. Also, if a positive meniscus lens having its convex surface facing the object side is provided in the rearward group, it will be advantageous for correcting distortion well.

The numerical data of the fifth to twelfth embodiments will be shown below. In the tables below, r represents the radius of curvature of each lens surface, d represents the center thickness and air space of each lens, n represents the refractive index for the d-line ($\lambda = 587.6$ nm), $\nu$ represents the Abbe number, and the subscript numbers represent the order from the object side. F represents the combined focal length of the RFC of each embodiment during infinity in-focus when combined with the standard objective lens of Table 1, M represents the combined photographic magnification during the very short distance in-focus, $D_0$ represents the distance from the foremost lens surface of the standard objective lens to the object, $D_1$ represents the spacing between the standard objective lens and the forward group of the RFC, $D_2$ represents the spacing between the forward group and the rearward group of the RFC, and $B_f$ represents the back focal length of the composite system. $f_R$ represents the focal length as RFC during infinity in-focus, and $F_1$ and $F_2$ represent the focal lengths of the forward group $G_1$ and the rearward group $G_2$, respectively, of the RFC. Also, $\alpha_1$ and $\alpha_2$ are the variation rates of the amount of variation $\Delta D_1$ in the spacing between the objective lens and the forward group $G_1$ of the RFC and the amount of variation $\Delta D_2$ in the spacing between the forward group $G_1$ and the rearward group $G_2$ of the RFC, respectively, relative to the amount of variation $\Delta B_f$ in the back focal length of the composite system, and $\alpha$ is the variation rate of the amount of variation in the full length relative to $\Delta B_f$. $\gamma_1$ and $\gamma_2$ are the variation rates of the amount of variation $\Delta D_2$ in the spacing between the forward group $G_1$ and the rearward group $G_2$ of the RFC and the amount of variation $\Delta B_f$ in the back focal length of the composite system, respectively, relative to the amount of variation $\Delta D_1$ in the spacing between the objective lens and the forward group $G_1$ of the RFC, and $\gamma$ is the variation rate of the amount of variation in the full length relative to $\Delta D_1$.

TABLE 6

(Fifth Embodiment)

$\beta = 1.6$

| $r_1 = 95.0$ | $d_1 = 2.5$ | $n_1 = 1.59507$ | $\nu_1 = 35.5$ | $L_1$ | |
| $r_2 = -61.141$ | $d_2 = 0.1$ | | | | |
| $r_3 = 527.908$ | $d_3 = 1.0$ | $n_2 = 1.84042$ | $\nu_2 = 43.3$ | $L_2$ | |
| $r_4 = 21.858$ | $d_4 = 0.5$ | | | | $G_1$ |
| $r_5 = 25.603$ | $d_5 = 3.4$ | $n_3 = 1.59507$ | $\nu_3 = 35.5$ | $L_3$ | |
| $r_6 = 1258.061$ | $d_6 = 2.1$ | | | | |
| $r_7 = -32.168$ | $d_7 = 1.0$ | $n_4 = 1.84042$ | $\nu_4 = 43.3$ | $L_4$ | |
| $r_8 = 2846.377$ | $d_8 = D_2$ | | | | |
| $r_9 = 36.200$ | $d_9 = 2.8$ | $n_5 = 1.51118$ | $\nu_5 = 50.9$ | $L_5$ | $G_2$ |
| $r_{10} = 141.254$ | | | | | |

| F or M | 82.5594 | −0.125 | |
|---|---|---|---|
| $D_0$ | ∞ | 653.070 | |
| $D_1$ | 1.0 | 7.0078 | $\Delta D_1 = 6.0078$ |
| $D_2$ | 3.0942 | 0.6910 | $\Delta D_2 = -2.4032$ |
| $B_f$ | 42.0573 | 38.4525 | $\Delta B_f = -3.6048$ |
| $\alpha = 0$ | | $\gamma = 0$ | $f_R = -80.7631$ |
| $\alpha_1 = -1.667$ | | $\gamma_1 = -0.4$ | $F_1 = -42.5634$ |
| $\alpha_2 = 0.6667$ | | $\gamma_2 = -0.6$ | $F_2 = 94.368$ |

TABLE 7

(Sixth Embodiment)

$\beta = 1.5$

| $r_1 = 500.0$ | $d_1 = 2.5$ | $n_1 = 1.59507$ | $\nu_1 = 35.5$ | $L_1$ | |
| $r_2 = -47.036$ | $d_2 = 0.2$ | | | | |
| $r_3 = -463.574$ | $d_3 = 1.0$ | $n_2 = 1.84042$ | $\nu_2 = 43.3$ | $L_2$ | |
| $r_4 = 34.683$ | $d_4 = 0.5$ | | | | $G_1$ |
| $r_5 = 39.693$ | $d_5 = 3.0$ | $n_3 = 1.59507$ | $\nu_3 = 35.5$ | $L_3$ | |
| $r_6 = -132.889$ | $d_6 = 2.2$ | | | | |
| $r_7 = -30.669$ | $d_7 = 1.0$ | $n_4 = 1.84042$ | $\nu_4 = 43.3$ | $L_4$ | |
| $r_8 = 339.135$ | $d_8 = D_2$ | | | | |
| $r_9 = 53.193$ | $d_9 = 2.2$ | $n_5 = 1.54814$ | $\nu_5 = 45.9$ | $L_5$ | $G_2$ |
| $r_{10} = 1724.775$ | | | | | |

| F or M | 77.4001 | −0.07 | |
|---|---|---|---|
| $D_0$ | ∞ | 1093.4527 | |
| $D_1$ | 1.0 | 5.1536 | $\Delta D_1 = 4.1536$ |
| $D_2$ | 1.5 | 0.6693 | $\Delta D_2 = -0.8307$ |
| $B_f$ | 40.4817 | 37.1588 | $\Delta B_f = -3.3229$ |
| $\alpha = 0$ | | $\gamma = 0$ | $f_R = -86.4912$ |
| $\alpha_1 = -1.25$ | | $\gamma_1 = -0.2$ | $F_1 = -46.0755$ |
| $\alpha_2 = 0.25$ | | $\gamma_2 = -0.8$ | $F_2 = 100.0834$ |

TABLE 8

(Seventh Embodiment)

$\beta = 1.4$

| $r_1 = 65.785$ | $d_1 = 2.9$ | $n_1 = 1.59507$ | $\nu_1 = 35.5$ | $L_1$ | |
| $r_2 = -58.904$ | $d_2 = 0.2$ | | | | |
| $r_3 = -161.540$ | $d_3 = 1.0$ | $n_2 = 1.84042$ | $\nu_2 = 43.3$ | $L_2$ | |
| $r_4 = 27.027$ | $d_4 = 1.0$ | | | | $G_1$ |
| $r_5 = 34.584$ | $d_5 = 3.3$ | $n_3 = 1.59507$ | $\nu_3 = 35.5$ | $L_3$ | |
| $r_6 = -140.675$ | $d_6 = 1.5$ | | | | |
| $r_7 = -37.323$ | $d_7 = 1.0$ | $n_4 = 1.84042$ | $\nu_4 = 43.3$ | $L_4$ | |
| $r_8 = 339.143$ | $d_8 = D_2$ | | | | |
| $r_9 = 38.662$ | $d_9 = 2.5$ | $n_5 = 1.46450$ | $\nu_5 = 65.8$ | $L_5$ | $G_2$ |
| $r_{10} = 162.687$ | | | | | |

| F or M | 72.9686 | −0.1 | |
|---|---|---|---|
| $D_0$ | ∞ | 807.5721 | |
| $D_1$ | 0.9766 | 0.9766 | $\Delta D_1 = 0$ |
| $D_2$ | 0.6 | 4.1973 | $\Delta D_2 = 3.5973$ |
| $B_f$ | 37.9237 | 43.9179 | $\Delta B_f = 5.9942$ |

TABLE 8-continued (Seventh Embodiment)

| | | | |
|---|---|---|---|
| $\alpha = 1.6$ | $\gamma$ | cannot be defined. | $f_R = -94.8194$ |
| $\alpha_1 = 0$ | $\gamma_1$ | | $F_1 = -50.817$ |
| $\alpha_2 = 0.600$ | $\gamma_2$ | | $F_2 = 108.485$ |

TABLE 9

(Eighth Embodiment)

$\beta = 1.4$

| | | | | | |
|---|---|---|---|---|---|
| $r_1 = 105.531$ | $d_1 = 1.0$ | $n_1 = 1.84042$ | $\nu_1 = 43.3$ | $L_1$ | |
| $r_2 = 29.529$ | $d_2 = 0.5$ | | | | |
| $r_3 = 32.727$ | $d_3 = 4.5$ | $n_2 = 1.59507$ | $\nu_2 = 35.5$ | $L_2$ | |
| $r_4 = -38.160$ | $d_4 = 1.0$ | | | | $G_1$ |
| $r_5 = -49.868$ | $d_5 = 1.0$ | $n_3 = 1.84042$ | $\nu_3 = 43.3$ | $L_3$ | |
| $r_6 = -72.809$ | $d_6 = 1.5$ | | | | |
| $r_7 = -41.039$ | $d_7 = 1.0$ | $n_4 = 1.84042$ | $\nu_4 = 43.3$ | $L_4$ | |
| $r_8 = 116.806$ | $d_8 = D_2$ | | | | |
| $r_9 = 39.085$ | $d_9 = 2.6$ | $n_5 = 1.50137$ | $\nu_5 = 56.5$ | $L_5$ | $G_2$ |
| $r_{10} = 119.484$ | | | | | |

| F or M | 72.9734 | −0.1 | |
|---|---|---|---|
| $D_0$ | $\infty$ | 802.2745 | |
| $D_1$ | 0.9721 | 0.9721 | $\Delta D_1 = 0$ |
| $D_2$ | 0.6 | 3.1382 | $\Delta D_2 = 2.5382$ |
| $B_f$ | 38.6414 | 44.9871 | $\Delta B_f = 6.3429$ |

| | | | |
|---|---|---|---|
| $\alpha = 1.4$ | $\gamma$ | cannot be defined. | $f_R = -96.8924$ |
| $\alpha_1 = 0$ | $\gamma_1$ | | $F_1 = -52.7683$ |
| $\alpha_2 = 0.400$ | $\gamma_2$ | | $F_2 = 114.6142$ |

TABLE 10

(Ninth Embodiment)

$\beta = 1.4$

| | | | | | |
|---|---|---|---|---|---|
| $r_1 = 143.302$ | $d_1 = 1.0$ | $n_1 = 1.84042$ | $\nu_1 = 43.3$ | $L_1$ | |
| $r_2 = 30.158$ | $d_2 = 0.5$ | | | | |
| $r_3 = 32.727$ | $d_3 = 5.0$ | $n_2 = 1.59507$ | $\nu_2 = 35.5$ | $L_2$ | $G_1$ |
| $r_4 = -38.551$ | $d_4 = 2.5$ | | | | |
| $r_5 = -35.904$ | $d_5 = 1.0$ | $n_3 = 1.84042$ | $\nu_3 = 43.3$ | $L_3$ | |
| $r_6 = 116.807$ | $d_6 = D_2$ | | | | |
| $r_7 = 36.215$ | $d_7 = 2.6$ | $n_4 = 1.50137$ | $\nu_4 = 56.5$ | $L_4$ | $G_2$ |
| $r_8 = 83.782$ | | | | | |

| F or M | 72.9734 | −0.1 | |
|---|---|---|---|
| $D_0$ | $\infty$ | 802.6944 | |
| $D_1$ | 0.9721 | 0.9721 | $\Delta D_1 = 0$ |
| $D_2$ | 0.6 | 3.3741 | $\Delta D_2 = 2.7741$ |
| $B_f$ | 38.9676 | 45.1322 | $\Delta B_f = 6.1646$ |

| | | | |
|---|---|---|---|
| $\alpha = 1.45$ | $\gamma$ | cannot be defined. | $f_R = -97.0969$ |
| $\alpha_1 = 0$ | $\gamma_1$ | | $F_1 = -55.0703$ |
| $\alpha_2 = 0.450$ | $\gamma_2$ | | $F_2 = 124.9465$ |

TABLE 11

(Tenth Embodiment)

$\beta = 1.4$

| | | | | | |
|---|---|---|---|---|---|
| $r_1 = 500.0$ | $d_1 = 2.5$ | $n_1 = 1.59507$ | $\nu_1 = 35.5$ | $L_1$ | |
| $r_2 = -46.392$ | $d_2 = 0.5$ | | | | |
| $r_3 = -96.993$ | $d_3 = 1.0$ | $n_2 = 1.84042$ | $\nu_2 = 43.3$ | $L_2$ | $G_1$ |
| $r_4 = 31.188$ | $d_4 = 1.0$ | | | | |
| $r_5 = 28.247$ | $d_5 = 4.0$ | $n_3 = 1.59507$ | $\nu_3 = 35.5$ | $L_3$ | |
| $r_6 = -132.460$ | $d_6 = D_2$ | | | | |
| $r_7 = -31.476$ | $d_7 = 1.0$ | $n_4 = 1.90265$ | $\nu_4 = 35.8$ | $L_4$ | $G_2$ |
| $r_8 = -67.136$ | | | | | |

| F or M | 72.9738 | −0.1 | |
|---|---|---|---|
| $D_0$ | $\infty$ | 787.2736 | |
| $D_1$ | 1.0 | 1.0 | $\Delta D_1 = 0$ |
| $D_2$ | 2.8 | 3.1212 | $\Delta D_2 = 0.3212$ |
| $B_f$ | 38.8244 | 45.2511 | $\Delta B_f = 6.4267$ |

| | | | |
|---|---|---|---|
| $\alpha = 1.05$ | $\gamma$ | cannot be defined. | $f_R = -95.8404$ |
| $\alpha_1 = 0$ | $\gamma_1$ | | $F_1 = 218.5363$ |
| $\alpha_2 = 0.05$ | $\gamma_2$ | | $F_2 = -66.5334$ |

TABLE 12

(Eleventh Embodiment)

$\beta = 1.834$

| | | | | | |
|---|---|---|---|---|---|
| $r_1 = 200.0$ | $d_1 = 2.5$ | $n_1 = 1.59507$ | $\nu_1 = 35.5$ | $L_1$ | |
| $r_2 = -50.776$ | $d_2 = 0.2$ | | | | |
| $r_3 = 715.233$ | $d_3 = 3.0$ | $n_2 = 1.64831$ | $\nu_2 = 33.8$ | $L_2$ | $G_1$ |
| $r_4 = -30.000$ | $d_4 = 1.0$ | $n_3 = 1.84042$ | $\nu_3 = 43.3$ | | |
| $r_5 = 31.470$ | $d_5 = 0.5$ | | | | |
| $r_6 = 38.359$ | $d_6 = 2.5$ | $n_4 = 1.59507$ | $\nu_4 = 35.5$ | $L_3$ | |
| $r_7 = -239.379$ | $d_7 = D_2$ | | | | |
| $r_8 = -35.298$ | $d_8 = 1.0$ | $n_5 = 1.87739$ | $\nu_5 = 38.1$ | $L_4$ | $G_2$ |
| $r_9 = 40.0$ | $d_9 = 2.5$ | $n_6 = 1.64831$ | $\nu_6 = 33.8$ | | |
| $r_{10} = -577.176$ | $d_{10} = 0.2$ | | | | |
| $r_{11} = 39.932$ | $d_{11} = 2.5$ | $n_7 = 1.51118$ | $\nu_7 = 50.9$ | $L_5$ | |
| $r_{12} = 162.674$ | | | | | |

| F or M | 94.6353 | −0.125 | |
|---|---|---|---|
| $D_0$ | $\infty$ | 742.0465 | |
| $D_1$ | 1.0 | 7.1386 | $\Delta D_1 = 6.1386$ |
| $D_2$ | 2.8 | 2.1861 | $\Delta D_2 = -0.6139$ |
| $B_f$ | 44.9229 | 39.3984 | $\Delta B_f = -5.5246$ |

| | | | |
|---|---|---|---|
| $\alpha = 0$ | $\gamma = 0$ | | $f_R = -57.2996$ |
| $\alpha_1 = -1.111$ | $\gamma_1 = -0.1$ | | $F_1 = 856.7929$ |
| $\alpha_2 = 0.111$ | $\gamma_2 = -0.9$ | | $F_2 = -51.9250$ |

TABLE 13

(Twelfth Embodiment)

$\beta = 1.4$

| | | | | | |
|---|---|---|---|---|---|
| $r_1 = 74.260$ | $d_1 = 1.0$ | $n_1 = 1.84042$ | $\nu_1 = 43.3$ | $L_1$ | |
| $r_2 = 28.691$ | $d_2 = 0.5$ | | | | |
| $r_3 = 32.727$ | $d_3 = 4.5$ | $n_2 = 1.59507$ | $\nu_2 = 35.5$ | $L_2$ | |
| $r_4 = -40.0$ | $d_4 = 1.0$ | | | | $G_1$ |
| $r_5 = -59.815$ | $d_5 = 1.0$ | $n_3 = 1.84042$ | $\nu_3 = 43.3$ | $L_3$ | |
| $r_6 = -140.152$ | $d_6 = 1.3$ | | | | |
| $r_7 = -42.637$ | $d_7 = 1.0$ | $n_4 = 1.84042$ | $\nu_4 = 43.3$ | $L_4$ | |
| $r_8 = 105.870$ | $d_8 = D_2$ | | | | |
| $r_9 = 40.335$ | $d_9 = 2.4$ | $n_5 = 1.50137$ | $\nu_5 = 56.5$ | $L_5$ | $G_2$ |
| $r_{10} = 155.251$ | | | | | |

| F or M | 72.9734 | −0.1 | |
|---|---|---|---|
| $D_0$ | $\infty$ | 749.5993 | |
| $D_1$ | 1.0 | 4.8062 | $\Delta D_1 = 3.8062$ |
| $D_2$ | 1.2 | 0.5149 | $\Delta D_2 = -0.6851$ |
| $B_f$ | 38.0912 | 38.0912 | $\Delta B_f = 0$ |

| | | | |
|---|---|---|---|
| $\alpha$ | cannot be defined. | $\gamma = 0.82$ | $f_R = -95.9395$ |
| $\alpha_1$ | | $\gamma_1 = -0.18$ | $F_1 = -50.9159$ |
| $\alpha_2$ | | $\gamma_2 = 0$ | $F_2 = 107.9336$ |

Figures 18, 19:
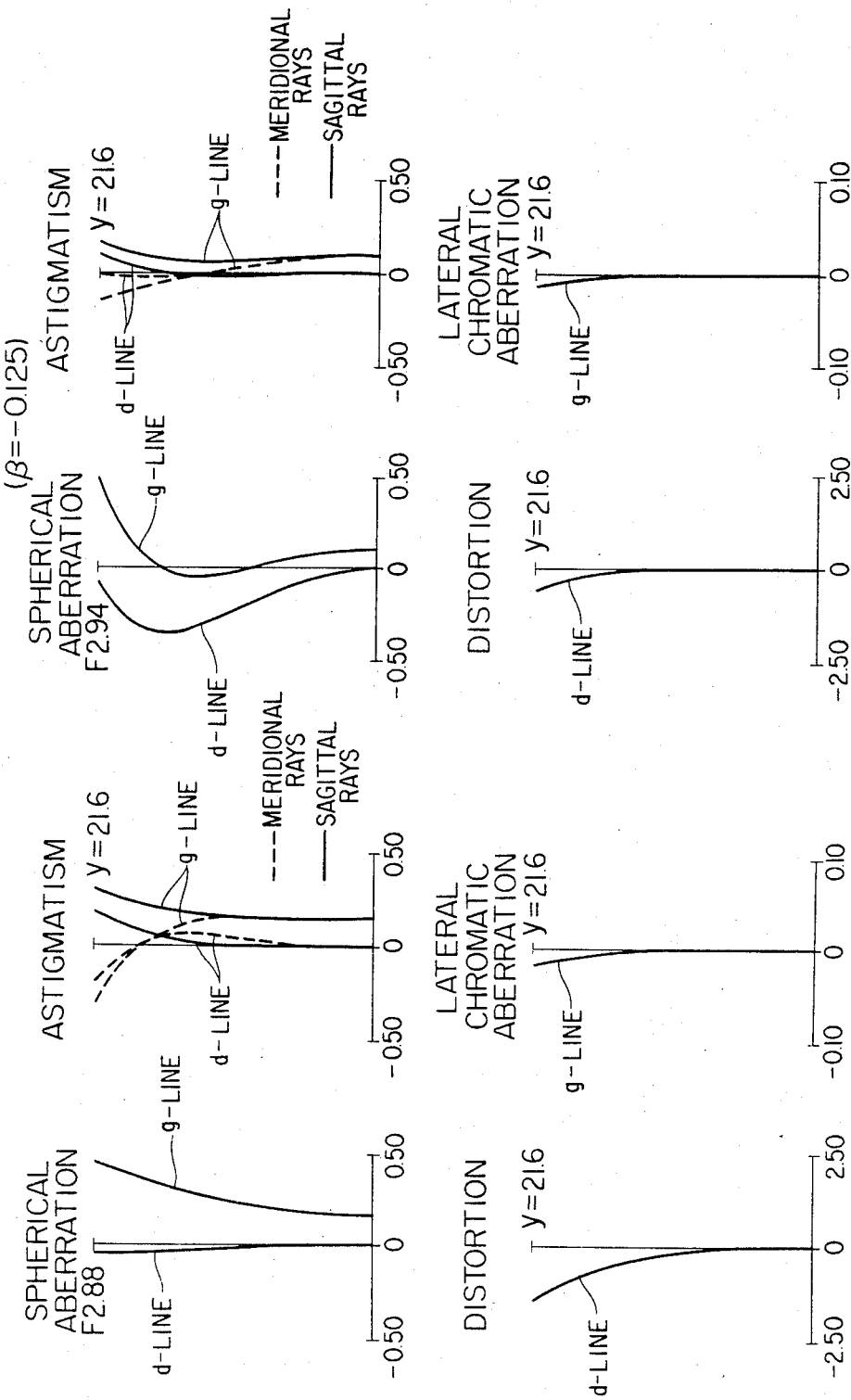
FIGS. 18 and 19 show the various aberrations when the rear focus conversion lens of the fifth embodiment is mounted to the standard objective lens, FIG. 18 showing the infinity in-focus state and FIG. 19 showing the short distance in-focus state.
Figure 20:
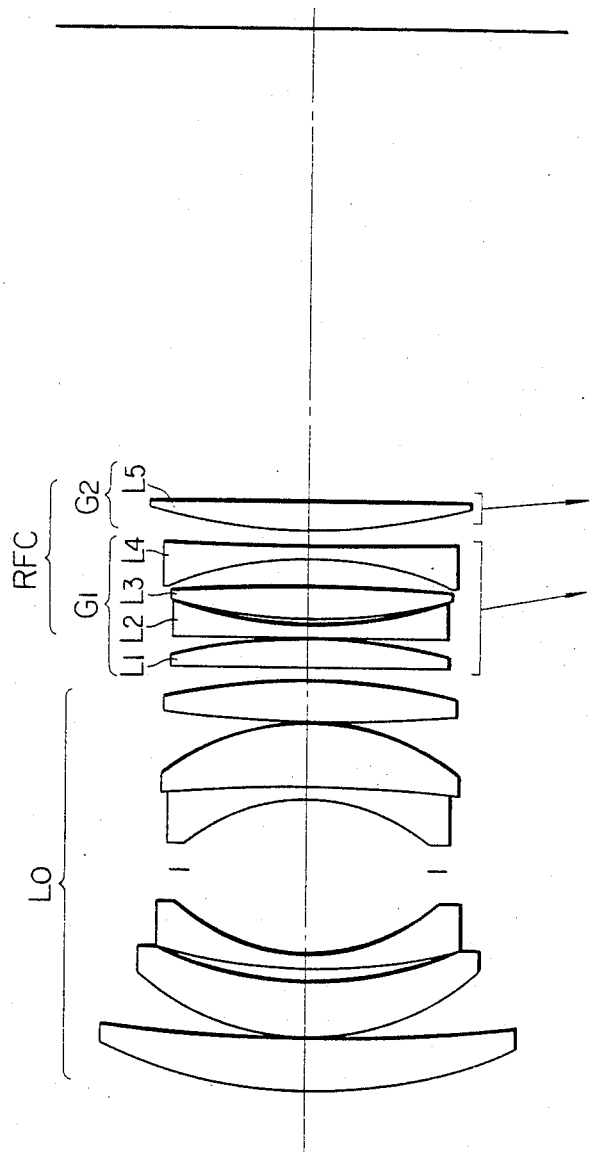
FIG. 20 is a lens construction view in the infinity in-focus state in which the rear focus conversion lens of a sixth embodiment having a magnification of 1.5 is mounted to the standard objective lens.
Figure 21:
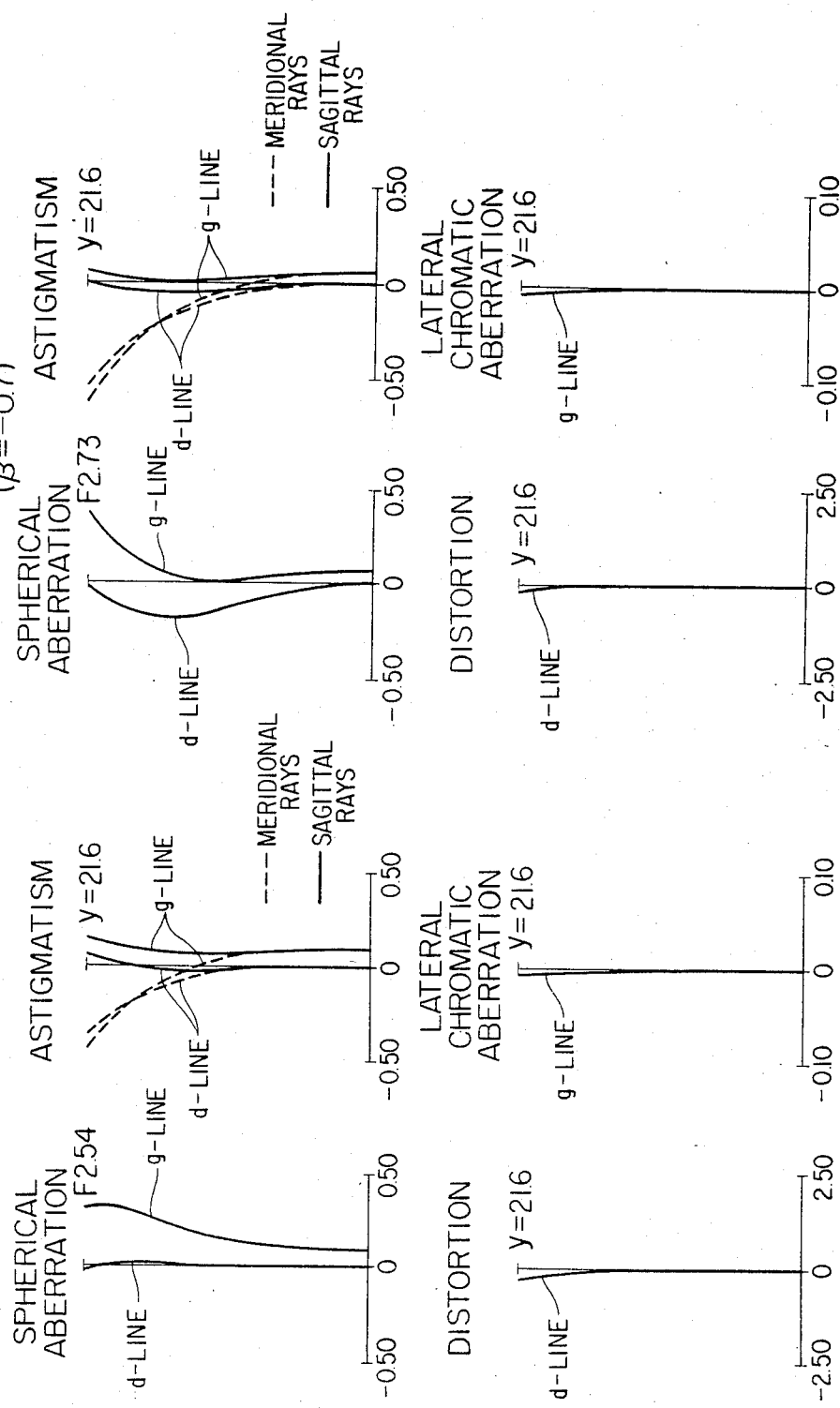
Figures 27, 28:
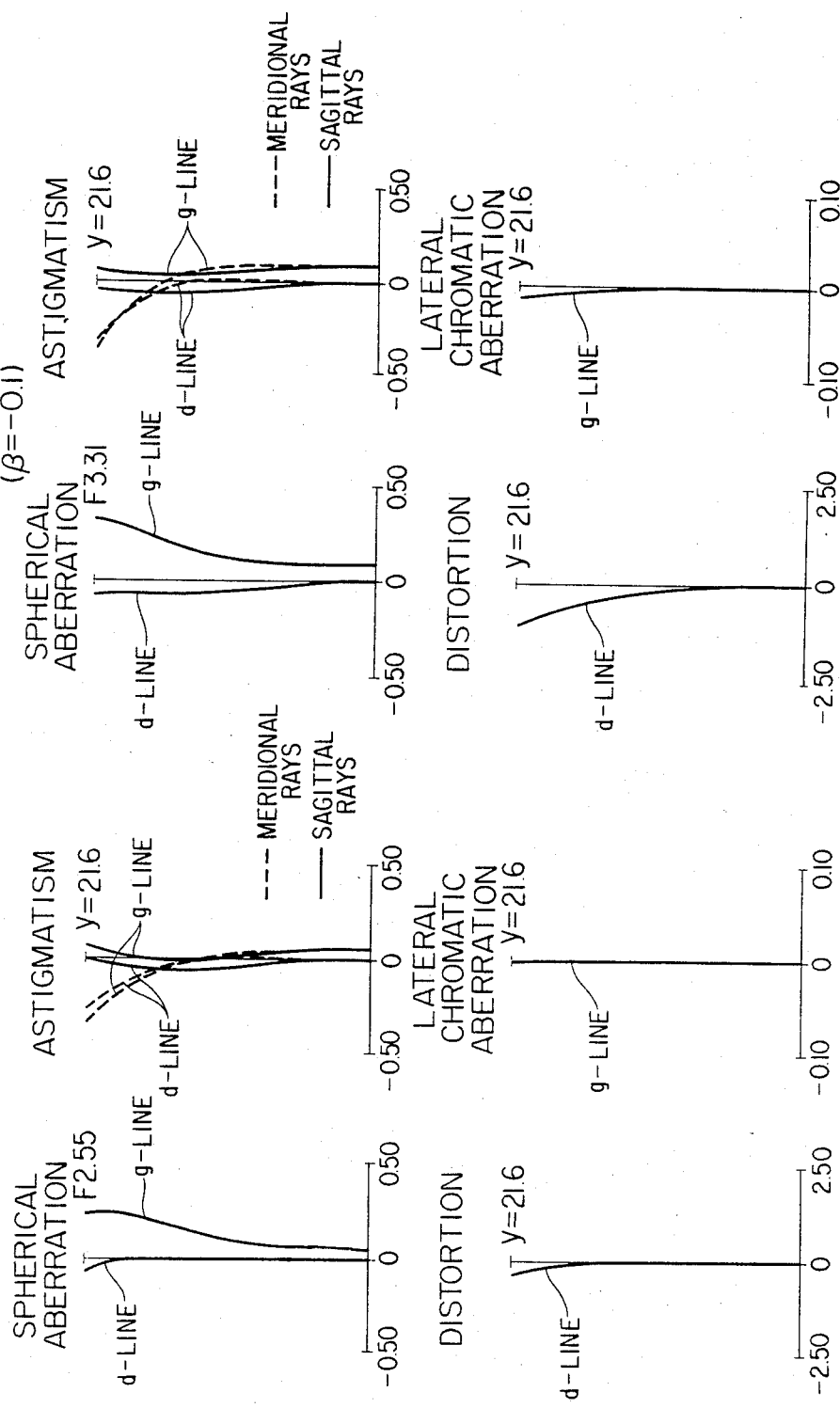
FIGS. 27 and 28 show the various aberrations when the rear focus conversion lens of the eighth embodiment is mounted to the standard objective lens, FIG. 27 showing the infinity in-focus state and FIG. 28 showing the short distance in-focus state.
Figures 30, 31:
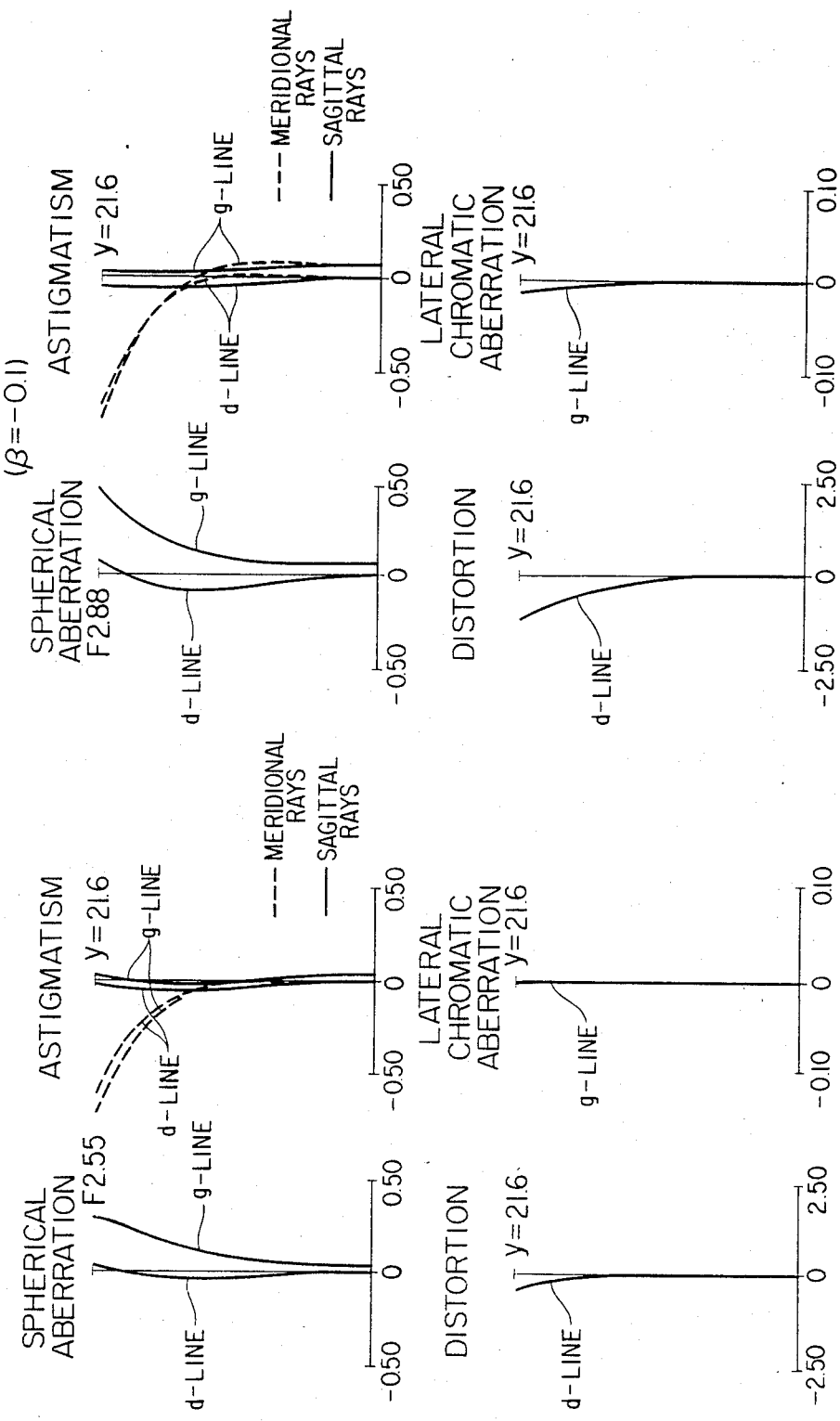
FIGS. 30 and 31 show the various aberrations when the rear focus conversion lens of the ninth embodiment is mounted to the standard objective lens, FIG. 30 showing the infinity in-focus state and FIG. 31 showing the short distance in-focus state.
Figure 36:
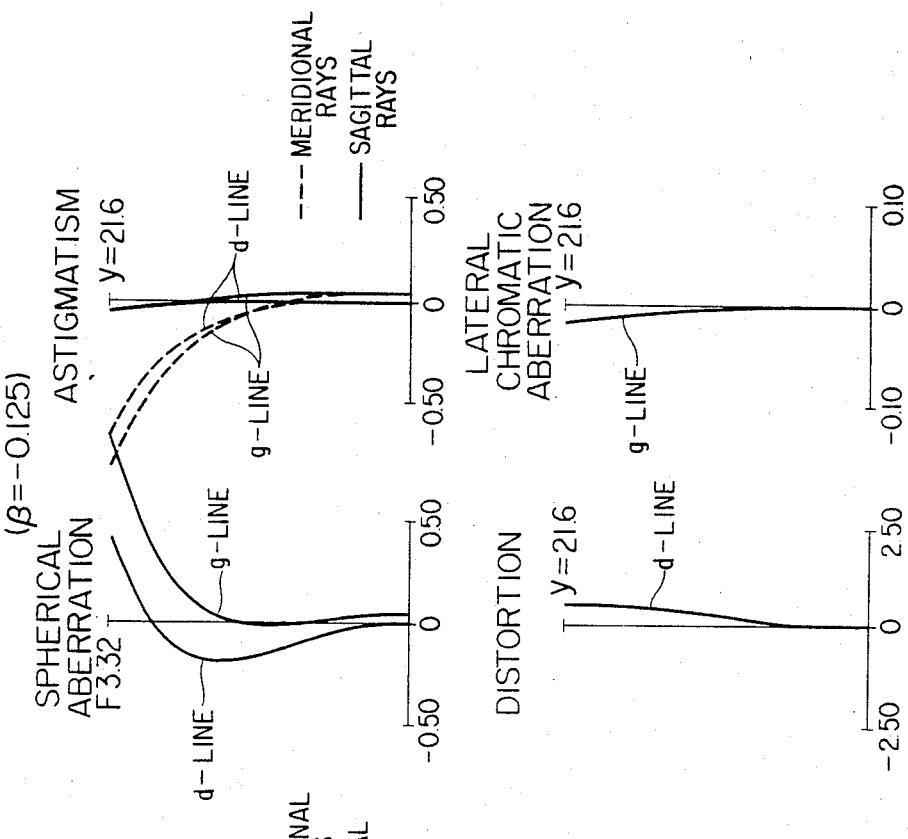
FIGS. 36 and 37 show the various aberrations when the rear focus conversion lens of the eleventh embodiment is mounted to the standard objective lens, FIG. 36 showing the infinity in-focus state and FIG. 37 showing the short distance in-focus state.
Figure 37:
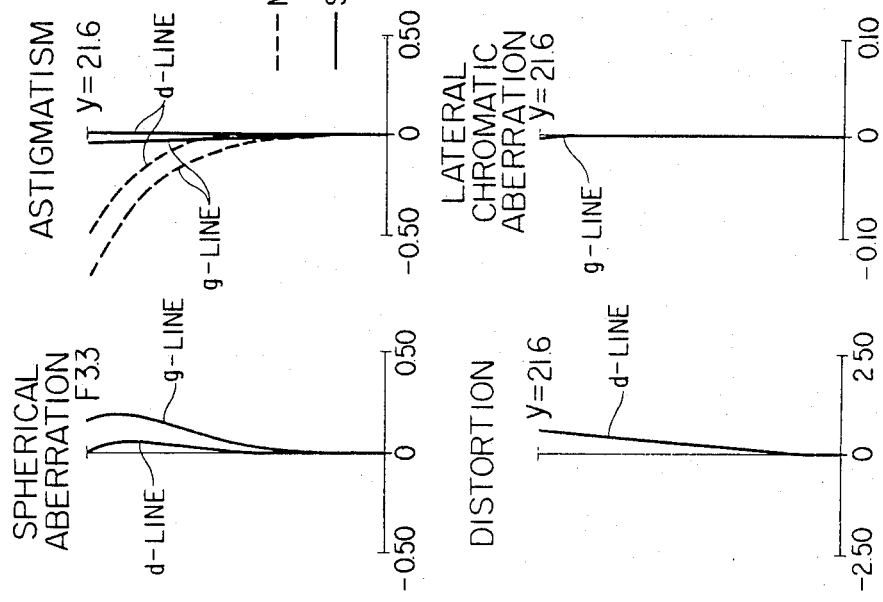

The various aberrations when the fifth embodiment is mounted on the standard objective lens of Table 1 are shown in FIGS. 18 and 19. FIG. 18 shows the infinity in-focus state and FIG. 19 shows the short distance in-focus state (M = −0.125). In these aberration graphs, the lateral chromatic aberration is shown for the g-line (λ=435.8 nm) and for the d-line. The various aberrations in the infinity in-focus state of the sixth embodiment are shown in FIG. 21, and the various aberrations in the short distance in-focus state (M = −0.07) are shown in FIG. 22. Likewise, the various aberrations in the infinity in-focus state and the short distance infocus state (M = −0.1) of the seventh embodiment are shown in FIGS. 24 and 25, respectively, and the various aberrations in the infinity in-focus state and the short distance in-focus state (M = −0.1) of the eighth embodiment are shown in FIGS. 27 and 28, respectively. Further, the various aberrations in the infinity in-focus state and the short distance in-focus state (M = −0.1) of the ninth embodiment are shown in FIGS. 30 and 31, respectively, the various aberrations in the infinity in-focus state and the short distance in-focus state (M = −0.1) of the tenth embodiment are shown in FIGS. 33 and 34, respectively, the various aberrations in the infinity in-focus state and the short distance in-focus state (M=−0.125) of the eleventh embodiment are shown in FIGS. 36 and 37, respectively, and the various aberrations in the infinity in-focus state and the short distance in-focus state (M=−0.1) of the twelfth embodiment are shown in FIGS. 39 and 40, respectively.

It is apparent from each of these aberration graphs that the RFC according to the present invention maintains a practically sufficiently good imaging performance from infinity to the short distance. Each embodiment is mountable not only on the standard objective lens shown in Table 1 but also on other various objective lenses, and can effect focusing from infinity to a predetermined short distance while likewise maintaining an excellent imaging performance.

Thus, the RFC according to the present invention can be versatilely mounted on all objective lenses and is compact and yet has an excellent performance from infinity to the short distance. If it is combined with an automatic focusing device, focusing can be accomplished for all objective lenses by movement of only the RFC and therefore, the focusing mechanism becomes common to all objective lenses and even if the objective lens is interchanged, the focusing mechanism need not be interchanged, and this is very convenient.

Now, the RFC according to the present invention has a negative refractive power and by moving it alone to the image side, focusing to an object at a shorter distance may be effected. Specifically, if the objective lens is brought into the infinity in-focus state, focusing to objects from infinity to any distance can be continuously accomplished by movement of only the RFC. Of course, with the condition in which the objective lens is fixedly disposed in any finite distance photographic position being as a new starting point, not only focusing to a shorter distance object can be accomplished by the RFC, but also with the objective lens brought into the shortest distance state, focusing to a shorter distance object can be accomplished by the RFC, and the RFC can also be utilized as a rear close-up lens. Also, if the RFC according to the present invention is combined with an automatic in-focus detecting device in a lens system for a single lens reflex camera, it can also be utilized as a versatile auto-focus conversion lens. By being combined with an auto-focus mechanism with the RFC being mounted rearwardly of a zoom lens, the RFC can also constitute a varifocal lens system. By this, the disadvantage peculiar to the focusing system using axial movement of the first group of the zoom lens, namely, the great variation in the angle of incidence of the principal light ray to the first group during short distance photography, can be greatly alleviated by focusing by the use of the RFC, and this eliminates the necessity of increasing the aperture of the lens. Focusing is also possible in interchangeable lenses having no focusing mechanism, and the number of groups in a zoom lens or the like can be decreased and further, the number of lenses can be reduced thereby reducing cost. In these points, the RFC according to the present invention is very useful.

Further, if an automatic focusing drive device and a range finding system or an in-focus detecting system are operatively associated with each other by adopting such a focusing system, the versatility of an auto-focusing conversion lens can be increased, and the conventional objective lens can be changed into an optical system capable of auto-focusing by mounting the RFC of the present invention thereon without reforming the objective lens in any way. In this case, a focusing drive system is contained within the barrel of the RFC, and it is desirable that the in-focus detecting system and the range finding system be contained within the camera body.

I claim:

1. A rear conversion lens removably mounted between an objective lens and a camera body for making the combined focal length of the rear conversion lens and the objective lens greater than the focal length of the objective lens, including:

a converter barrel;

a lens group of negative refractive power movable in said converter barrel along the optical axis for converting a convergent light beam from said objective lens to a less convergent light beam and for condensing the light beam on an image plane in the camera body; and means for moving said lens group of negative refractive power along said optical axis in said converter barrel with respect to said objective lens;

focusing to objects from infinity to a short distance being effected by the movement of said lens group of negative refractive power by said moving means, and wherein when said lens group of negative refractive power is moved toward the image side by $\Delta B(>0)$ for focusing to the short distance from infinity in-focus state, the magnification $\beta'$ of the rear conversion lens in the short distance in-focus state is substantially given by the following equation:

$$\beta' = 1 + \frac{\beta D_0 + \Delta B}{f_R}$$

where $\beta$ is the enlargement magnification of the rear conversion lens in the infinity in-focus state, $D_0$ is the distance from a principal point of the rear conversion lens to an image point of the objective lens and $f_R$ is the focal length of the rear conversion lens.

2. A rear conversion lens according to claim 1, satisfying the following conditions:

$$1.3 < \beta < 2.5 \tag{1}$$

$$\left|\frac{\Delta B_f}{f_R}\right| < 0.2 \tag{2}$$

where $\beta$ is the enlargement magnification of the focal length in the infinity in-focus state by said rear conversion lens, $\Delta B_f$ is the amount of variation in the combined back focal length when focused to from infinity to a predetermined short distance, and $f_R$ is the focal length of said rear conversion lens.

3. A rear conversion lens according to claim 2, satisfying the following conditions:

$$0.17 < \frac{\Sigma d}{\beta \cdot MB} < 0.25 \tag{3}$$

$$0.6 < \frac{B_f}{-d_0 \cdot \beta} < 0.85 \tag{4}$$

where Σd is the distance from the foremost lens surface to the last lens surface of said rear conversion lens, $B_f$ is the back focal length during the infinity in-focus of said rear conversion lens, $d_0$ is the object point distance of said rear conversion lens, namely, the distance between the image point of the mounted objective lens and the foremost lens surface of said rear conversion lens, and MB is the flange back of the camera body on which said rear conversion lens is mounted.

4. A rear conversion lens according to claim 3, wherein said lens group of negative refractive power includes a forward group having, in succession from the object side, a positive lens as a first component having its surface of sharper curvature facing the image side, a biconcave negative lens as a second component, and a positive lens as a third component having its surface of sharper curvature facing the object side, and a rearward group having a negative lens having its surface of sharper curvature facing the object side.

5. A rear conversion lens according to claim 4, satisfying the following conditions:

$$1.5 < \left|\frac{f_1}{f_2}\right| < 3.2 \quad (5)$$

$$1.3 < \left|\frac{f_3}{f_2}\right| < 3.2 \quad (6)$$

where $f_1$, $f_2$ and $f_3$ are the focal lengths of said positive lens ($L_1$) as a first component, said negative lens ($L_2$) as a second component and said positive lens ($L_3$) as a third component, respectively.

6. A rear conversion lens according to claim 5, satisfying the following conditions:

$$n_- > 1.82$$

$$\nu_- > 35$$

where $n_-$ is the highest refractive index of the negative lens in said lens group of negative refractive power, and $\nu_-$ is the lowest Abbe number of the negative lens in said lens group of negative refractive power.

7. A rear conversion lens according to claim 6, wherein the refractive index of each of the positive lenses in said forward group is 1.65 or less and the Abbe number thereof is 40 or less.

8. A rear conversion lens according to claim 7, wherein numerical data are as follows:

| | $\beta = 1.60$ | $f_R = -75.3339$ | | |
|---|---|---|---|---|
| | $d_0 = -36.6054$ | | | |
| $r_1 = 133.317$ | $d_1 = 2.5$ | $n_1 = 1.59507$ | $\nu_1 = 35.5$ | $L_1$ |
| $r_2 = -51.168$ | $d_2 = 0.5$ | | | |
| $r_3 = -190.874$ | $d_3 = 1.0$ | $n_2 = 1.84042$ | $\nu_2 = 43.3$ | $L_2$ |
| $r_4 = 24.064$ | $d_4 = 0.5$ | | | |
| $r_5 = 27.743$ | $d_5 = 4.0$ | $n_3 = 1.59507$ | $\nu_3 = 35.5$ | $L_3$ |
| $r_6 = -109.951$ | $d_6 = 1.5$ | | | |
| $r_7 = -31.481$ | $d_7 = 1.0$ | $n_4 = 1.84042$ | $\nu_4 = 43.3$ | $L_4$ |
| $r_8 = 2846.347$ | $d_8 = 0.1$ | | | |
| $r_9 = 37.218$ | $d_9 = 2.5$ | $n_5 = 1.51118$ | $\nu_5 = 50.9$ | $L_5$ |
| $r_{10} = 115.703$ | | | | |

| F or M | 82.5596 | −0.100 |
|---|---|---|
| $D_m$ | ∞ | 810.4909 |
| $D_c$ | 1.0 | 6.7412 |
| $B_f$ | 44.0080 | 38.2668 |

| Σd = 13.6 | $f_2 = -25.374$ |
|---|---|
| $f_1 = 62.453$ | $f_3 = 37.636$ |
| | $\Delta B_f = 5.7412$ | where r represents the radius of curvature of each lens surface, d represents the center thickness and air space of each lens, n represents the refractive index for the d-line (λ=587.6 nm), $\nu$ represents the Abbe number, the subscript numbers represent the order from the object side, $d_0$ represents the distance between the image point by the objective lens and the foremost lens surface of the rear conversion lens, F represents the combined focal length of the rear conversion lens when combined with said objective lens, M represents the combined photographic magnification, $D_m$ represents the distance from the foremost lens surface of the objective lens to the object, $D_c$ represents the air space during the infinity in-focus of the objective lens and the rear conversion lens, $B_f$ represents the back focal length of the composite system of the objective lens and the rear conversion lens, $\Delta B_f$ represents the amount of variation in the back focal length, $\beta$ represents the magnification of the rear conversion lens, $f_R$ represents the focal length of the rear conversion lens, Σd represents the distance from the foremost lens surface of the rear conversion lens to the last lens surface thereof, and $f_1$, $f_2$ and $f_3$ represent the focal lengths of the first, second and third components ($L_1$, $L_2$, $L_3$), respectively, in the forward group of the rear conversion lens.

9. A rear conversion lens according to claim 7, wherein numerical data are as follows:

| | $\beta = 1.50$ | $f_R = -87.2348$ | | |
|---|---|---|---|---|
| | $d_0 = -36.6054$ | | | |
| $r_1 = 500.000$ | $d_1 = 2.5$ | $n_1 = 1.59507$ | $\nu_1 = 35.5$ | $L_1$ |
| $r_2 = -45.149$ | $d_2 = 0.2$ | | | |
| $r_3 = -325.888$ | $d_3 = 1.0$ | $n_2 = 1.84042$ | $\nu_2 = 43.3$ | $L_2$ |
| $r_4 = 33.269$ | $d_4 = 0.5$ | | | |
| $r_5 = 39.693$ | $d_5 = 3.0$ | $n_3 = 1.59507$ | $\nu_3 = 35.5$ | $L_3$ |
| $r_6 = -132.889$ | $d_6 = 2.2$ | | | |
| $r_7 = -28.526$ | $d_7 = 1.0$ | $n_4 = 1.84042$ | $\nu_4 = 43.3$ | $L_4$ |
| $r_8 = 339.137$ | $d_8 = 0.2$ | | | |
| $r_9 = 57.000$ | $d_9 = 2.6$ | $n_5 = 1.54814$ | $\nu_5 = 45.9$ | $L_5$ |
| $r_{10} = -137.274$ | | | | |

| F or M | 77.4002 | −0.0667 |
|---|---|---|
| $D_m$ | ∞ | 1146.2387 |
| $D_c$ | 1.0 | 5.3935 |
| $B_f$ | 41.6888 | 37.2952 |

| Σd = 13.2 | $f_2 = -35.874$ |
|---|---|
| $f_1 = 69.707$ | $f_3 = 51.697$ |
| | $\Delta B_f = 4.3936$ | where r represents the radius of curvature of each lens surface, d represents the center thickness and air space of each lens, n represents the refractive index for the d-line (λ=587.6 nm), $\nu$ represents the Abbe number, the subscript numbers represent the order from the object side, $d_0$ represents the distance between the image point by the objective lens and the foremost lens surface of the rear conversion lens, F represents the combined focal length of the rear conversion lens when combined with said objective lens, M represents the combined photographic magnification, $D_m$ represents the distance from the foremost lens surface of the objective lens to the object, $D_c$ represent the air space during the infinity in-focus of the objective lens and the rear conversion lens, $B_f$ represents the back focal length of the composite system of the objective lens and the rear conversion lens, $\Delta B_f$ represents the amount of variation in the back focal length, $\beta$ represents the magnification of the rear conversion lens, $f_R$ represents the focal length of the rear conversion lens, $\Sigma d$ represents the distance from the foremost lens surface of the rear conversion lens to the last lens surface thereof, and $f_1$, $f_2$ and $f_3$ represent the focal lengths of the first, second and third components ($L_1$, $L_2$, $L_3$), respectively, in the forward group of the rear conversion lens.

10. a rear conversion lens according to claim 7, wherein numerical data are as follows:

$\beta = 1.4142$  $f_R = -96.9405$
$d_0 = -36.6054$

| | | | | |
|---|---|---|---|---|
| $r_1 = 500.000$ | $d_1 = 2.5$ | $n_1 = 1.61293$ | $\nu_1 = 37.0$ | $L_1$ |
| $r_2 = -44.069$ | $d_2 = 0.5$ | | | |
| $r_3 = -91.297$ | $d_3 = 1.0$ | $n_2 = 1.84042$ | $\nu_2 = 43.3$ | $L_2$ |
| $r_4 = 32.578$ | $d_4 = 1.0$ | | | |
| $r_5 = 29.021$ | $d_5 = 4.0$ | $n_3 = 1.59507$ | $\nu_3 = 35.5$ | $L_3$ |
| $r_6 = -132.459$ | $d_6 = 2.0$ | | | |
| $r_7 = -30.959$ | $d_7 = 1.0$ | $n_4 = 1.87739$ | $\nu_4 = 38.1$ | $L_4$ |
| $r_8 = -72.603$ | | | | |

| F or M | 72.9734 | −0.0333 |
|---|---|---|
| $D_m$ | ∞ | 2173.0891 |
| $D_c$ | 1.0 | 3.5255 |
| $B_f$ | 39.7209 | 37.1952 |

$\Sigma d = 12.0$  $f_2 = -28.464$
$f_1 = 66.191$  $f_3 = 40.377$
$\Delta B_f = 2.5257$ where r represents the radius of curvature of each lens surface, d represents the center thickness and air space of each lens, n represents the refractive index for the d-line ($\lambda = 587.6$ nm), $\nu$ represent the Abbe number, the subscript numbers represent the order from the object side, $d_0$ represents the distance between the image point by the objective lens and the foremost lens surface of the rear conversion lens, F represents the combined focal length of the rear conversion lens when combined with said objective lens, M represents the combined photographic magnification, $D_m$ represents the distance from the foremost lens surface of the objective lens to the object, $D_c$ represents the air space during the infinity in-focus of the objective lens and the rear conversion lens, Bf represents the back focal length of the composite system of the objective lens and the rear conversion lens, $\Delta B_f$ represents the amount of variation in the back focal length, $\beta$ represents the magnification of the rear conversion lens, $f_R$ represents the focal length of the rear conversion lens, $\Sigma d$ represents the distance from the foremost lens surface of the rear conversion lens to the last lens surface thereof, and $f_1$, $f_2$ and $f_3$ represent the focal lengths of the first, second and third components ($L_1$, $L_2$, $L_3$), respectively, in the forward group of the rear conversion lens.

11. A rear conversion lens according to claim 7, wherein numerical data are as follows:

$\beta = 1.8340$  $f_R = -57.1288$
$d_0 = -36.1054$

| | | | | |
|---|---|---|---|---|
| $r_1 = 1947.195$ | $d_1 = 2.5$ | $n_1 = 1.59507$ | $\nu_1 = 35.5$ | $L_1$ |
| $r_2 = -45.857$ | $d_2 = 0.2$ | | | |
| $r_3 = 169.434$ | $d_3 = 3.0$ | $n_2 = 1.59507$ | $\nu_2 = 35.5$ | ⎫ |
| | | | | ⎬ $L_2$ |
| $r_4 = -31.215$ | $d_4 = 1.0$ | $n_3 = 1.84042$ | $\nu_3 = 43.3$ | ⎭ |
| $r_5 = 33.579$ | $d_5 = 1.0$ | | | |
| $r_6 = 38.359$ | $d_6 = 2.5$ | $n_4 = 1.59507$ | $\nu_4 = 35.5$ | $L_3$ |
| $r_7 = -227.416$ | $d_7 = 2.0$ | | | |
| $r_8 = -34.862$ | $d_8 = 1.0$ | $n_5 = 1.84042$ | $\nu_5 = 43.3$ | ⎫ |
| | | | | ⎬ $L_4$ |

-continued

| | | | |
|---|---|---|---|
| $r_9 = 40.000$ | $d_9 = 2.5$ | $n_6 = 1.59507$ | $\nu_6 = 35.5$ |
| $r_{10} = 420.996$ | $d_{10} = 0.2$ | | |
| $r_{11} = 38.280$ | $d_{11} = 2.5$ | $n_7 = 1.46450$ | $\nu_7 = 65.8$  $L_5$ |
| $r_{12} = 246.419$ | | | |

| F or M | 94.6350 | −0.1 |
|---|---|---|
| $D_m$ | ∞ | 932.1935 |
| $D_c$ | 1.5 | 5.7491 |
| $B_f$ | 44.5671 | 40.3180 |

$\Sigma d = 18.4$  $f_2 = -34.226$
$f_1 = 75.324$  $f_3 = 55.352$
$\Delta B_f = 4.2491$ where r represents the radius of curvature of each lens surface, d represents the center thickness and air space of each lens, n represents the refractive index for the d-line ($\lambda = 587.6$ nm), $\nu$ represents the Abbe number, the subscript numbers represent the order from the object side, $d_0$ represents the distance between the image point by the objective lens and the foremost lens surface of the rear conversion lens, F represents the combined focal length of the rear conversion lens when combined with said objective lens, M represents the combined photographic magnification, $D_m$ represents the distance from the foremost lens surface of the objective lens to the object, $D_c$ represents the air space during the infinity in-focus of the objective lens and the rear conversion lens, $B_f$ represents the back focal length of the composite system of the objective lens and the rear conversion lens, $\Delta B_f$ represents the amount of variation in the back focal length, $\beta$ represents the magnifcation of the rear conversion lens, $f_R$ represents the focal length of the rear conversion lens, $\Sigma d$ represents the distance from the foremost lens surface of the rear conversion lens to the last lens surface thereof, and $f_1$, $f_2$ and $f_3$ represent the focal lengths of the first, second and third components ($L_1$, $L_2$, $L_3$), respectively, in the forward group of the rear conversion lens.

12. A rear conversion lens removably mounted between an objective lens and a camera body and having a negative refractive power for making the combined focal length of the rear conversion lens and the objective lens greater than the focal length of the objective lens, said rear conversion lens including:

a forward group having a plurality of lenses; and
a rearward group having at least one lens;
said forward group and said rearward group being movable relative to each other along the optical axis, focusing to objects from infinity to a short distance being accomplished by relative movement of said two groups and the relative movement of said two groups being such that the aberration fluctuation occurring when the rear conversion lens is focused to a short distance object can be offset.

13. A rear conversion lens according to claim 12, wherein when the variation rates of the amount of variation $\Delta D_1$ in the spacing between said objective lens and said forward group during in-focus and the amount of variation $\Delta D_2$ in the spacing between said forward group and said rearward group relative to the amount of variation $\Delta B_f$ in the combined back focal length of said objective lens and said rear conversion lens are $\alpha_1$ and $\alpha_2$, respectively, and $\alpha$ is defined as $\alpha = \alpha_1 + \alpha_2 + 1$, the following condition is satisfied:

$$-0.2 < \alpha < 2.5$$

14. A rear conversion lens according to claim 12, wherein when the variation rates of the amount of variation $\Delta D_2$ in the air space between said forward group and said rearward group and the amount of variation $\Delta B_f$ in the combined back focal length of said objective lens and said rear conversion lens relative to the amount of variation $\Delta D_1$ in the air space between said objective lens and said forward group during in-focus are $\gamma_1$ and $\gamma_2$, respectively, and $\gamma$ is defined as $\gamma=\gamma_1+\gamma_2+1$, the following condition is satisfied:

$$-0.2<\gamma<2.5$$

15. A rear conversion lens according to claim 12, satisfying the following conditions:

$$1.3<\beta<2.5$$

$$0.6<|F_2/f_R|<1.3$$

where $\beta$ is the enlargement magnification of the focal length in the infinity in-focus state of said rear conversion lens, $f_R$ is the focal length of said rear conversion lens, and $F_2$ is the focal length of the rearward group in said rear conversion lens.

16. A rear conversion lens according to claim 15, wherein said forward group and said rearward group are both movable toward the image side to be focused to an object at a shorter distance.

17. A rear conversion lens according to claim 16, wherein said forward group has at least two positive lenses and at least one negative lens and said rearward group has at least one positive lens.

18. A rear conversion lens according to claim 17, wherein numerical data are as follows:

| | | $\beta = 1.6$ | | |
|---|---|---|---|---|
| $r_1 = 95.0$ | $d_1 = 2.5$ | $n_1 = 1.59507$ | $\nu_1 = 35.5$ | $L_1$ |
| $r_2 = -61.141$ | $d_2 = 0.1$ | | | |
| $r_3 = 527.908$ | $d_3 = 1.0$ | $n_2 = 1.84042$ | $\nu_2 = 43.3$ | $L_2$ |
| $r_4 = 21.858$ | $d_4 = 0.5$ | | | |
| $r_5 = 25.603$ | $d_5 = 3.4$ | $n_3 = 1.59507$ | $\nu_3 = 35.5$ | $L_3$ |
| $r_6 = 1258.061$ | $d_6 = 2.1$ | | | |
| $r_7 = -32.168$ | $d_7 = 1.0$ | $n_4 = 1.84042$ | $\nu_4 = 43.3$ | $L_4$ |
| $r_8 = 2846.377$ | $d_8 = D_2$ | | | |
| $r_9 = 36.200$ | $d_9 = 2.8$ | $n_5 = 1.51118$ | $\nu_5 = 50.9$ | $L_5$ |
| $r_{10} = 141.254$ | | | | |

$G_1$ groups $L_1$–$L_4$; $G_2$ is $L_5$.

| F or M | 82.5594 | −0.125 | |
|---|---|---|---|
| $D_0$ | ∞ | 653.070 | $\Delta D_1 = 6.0078$ |
| $D_1$ | 1.0 | 7.0078 | $\Delta D_2 = -2.4032$ |
| $D_2$ | 3.0942 | 0.6910 | $\Delta B_f = -3.6048$ |
| $B_f$ | 42.0573 | 38.4525 | |
| $\alpha = 0$ | | $\gamma = 0$ | $f_R = -80.7631$ |
| $\alpha_1 = -1.667$ | | $\gamma_1 = -0.4$ | $F_1 = -42.5634$ |
| $\alpha_2 = 0.6667$ | | $\gamma_2 = -0.6$ | $F_2 = 94.368$ | where $\beta$ represents the magnification of the rear conversion lens, r represents the radius of curvature of each lens surface, d represents the center thickness and air space of each lens, n represents the refractive index for the d-line ($\lambda = 587.6$ nm), $\nu$ represents the Abbe number, the subscript numbers represent the order from the object side, F represents the combined focal length of the rear conversion lens during infinity in-focus when combined with said objective lens, M represents the combined photographic magnification during very short distance in-focus, $D_0$ represents the distance from the foremost lens surface of the objective lens to the object, $D_1$ represents the spacing between the objective lens and the rear conversion lens, $D_2$ represents the spacing between the forward group and the rearward group of the rear conversion lens, $B_f$ represents the back focal length of the composite system, $f_R$ represents the focal length as the rear conversion lens during infinity in-focus, $F_1$ and $F_2$ represent the focal lengths of the forward group and the rearward group, respectively, of the rear conversion lens, $\alpha_1$ and $\alpha_2$ represent the variation rates of the amount of variation $\Delta D_1$ in the spacing between the objective lens and the forward group of the rear conversion lens and the amount of variation $\Delta D_2$ in the spacing between the forward group and the rearward group of the rear conversion lens, respectively, relative to the amount of variation $\Delta B_f$ in the back focal length of the composite system, $\alpha$ represents the variation rate of the amount of variation in the full length relative to $\Delta B_f$, $\gamma_1$ and $\gamma_2$ are the variation rates of the amount of variation $\Delta D_2$ in the spacing between the forward group and the rearward group of the rear conversion lens and the amount of variation $\Delta B_f$ in the back focal length of the composite system, respectively, relative to the amount of variation $\Delta D_1$ in the spacing between the objective lens and the forward group of the rear conversion lens, and $\gamma$ is the variation rate of the amount of variation in the full length relative to $\Delta D_1$.

19. A rear conversion lens according to claim 17, wherein numerical data are as follows:

| | | $\beta = 1.5$ | | |
|---|---|---|---|---|
| $r_1 = 500.0$ | $d_1 = 2.5$ | $n_1 = 1.59507$ | $\nu_1 = 35.5$ | $L_1$ |
| $r_2 = -47.036$ | $d_2 = 0.2$ | | | |
| $r_3 = -463.574$ | $d_3 = 1.0$ | $n_2 = 1.84042$ | $\nu_2 = 43.3$ | $L_2$ |
| $r_4 = 34.683$ | $d_4 = 0.5$ | | | |
| $r_5 = 39.693$ | $d_5 = 3.0$ | $n_3 = 1.59507$ | $\nu_3 = 35.5$ | $L_3$ |
| $r_6 = -132.889$ | $d_6 = 2.2$ | | | |
| $r_7 = -30.669$ | $d_7 = 1.0$ | $n_4 = 1.84042$ | $\nu_4 = 43.3$ | $L_4$ |
| $r_8 = 339.135$ | $d_8 = D_2$ | | | |
| $r_9 = 53.193$ | $d_9 = 2.2$ | $n_5 = 1.54814$ | $\nu_5 = 45.9$ | $L_5$ |
| $r_{10} = 1724.775$ | | | | |

$G_1$ groups $L_1$–$L_4$; $G_2$ is $L_5$.

| F or M | 77.4001 | −0.07 | |
|---|---|---|---|
| $D_0$ | ∞ | 1093.4527 | |
| $D_1$ | 1.0 | 5.1536 | $\Delta D_1 = 4.1536$ |
| $D_2$ | 1.5 | 0.6693 | $\Delta D_2 = 0.8307$ |
| $B_f$ | 40.4817 | 37.1588 | $\Delta B_f = -3.3229$ |
| $\alpha = 0$ | | $\gamma = 0$ | $f_R = -86.4912$ |
| $\alpha_1 = -1.25$ | | $\gamma_1 = -0.2$ | $F_1 = -46.0755$ |
| $\alpha_2 = 0.25$ | | $\gamma_2 = -0.8$ | $F_2 = 100.0834$ | where $\beta$ represents the magnification of the rear conversion lens, r represents the radius of curvature of each lens surface, d represents the center thickness and air space of each lens, n represents the refractive index for the d-line ($\lambda = 587.6$ nm), $\nu$ represents the Abbe number, the subscript numbers represent the order from the object side, F represents the combined focal length of the rear conversion lens during infinity in-focus when combined with said objective lens, M represents the combined photographic magnification during very short distance in-focus, $D_0$ represents the distance from the foremost lens surface of the objective lens to the object, $D_1$ represents the spacing between the objective lens and the rear conversion lens, $D_2$ represents the spacing between the forward group and the rearward group of the rear conversion lens, $B_f$ represents the back focal length of the composite system, $f_R$ represents the focal length as the rear conversion lens during infinity in-focus, $F_1$ and $F_2$ represent the focal lengths of the forward group and the rearward group, respectively, of the rear conversion lens, $\alpha_1$ and $\alpha_2$ represent the variation rates of the amount of variation $\Delta D_1$ in the spacing between the objective lens and the forward group of the rear conversion lens and the amount of variation $\Delta D_2$ in the spacing between the forward group and the rearward group of the rear conversion lens, respectively, relative to the amount of variation $\Delta B_f$ in the back focal length of the composite system, $\alpha$ represents the variation rate of the amount of variation in the full length relative to $\Delta B_f$, $\gamma_1$ and $\gamma_2$ are the variation rates of the amount of variation $\Delta D_2$ in the spacing between the forward group and the rearward group of the rear conversion lens and the amount of variation $\Delta B_f$ in the back focal length of the composite system, respectively, relative to the amount of variation $\Delta D_1$ in the spacing between the objective lens and the forward group of the rear conversion lens, and $\gamma$ is the variation rate of the amount of variation in the full length relative to $\Delta D_1$.

20. A rear conversion lens according to claim 17, wherein numerical data are as follows:

| | | $\beta = 1.834$ | | |
|---|---|---|---|---|
| $r_1 = 200.0$ | $d_1 = 2.5$ | $n_1 = 1.59507$ | $\nu_1 = 35.5$ | $L_1$ ⎫ |
| $r_2 = -50.776$ | $d_2 = 0.2$ | | | |
| $r_3 = 715.233$ | $d_3 = 3.0$ | $n_2 = 1.64831$ | $\nu_2 = 33.8$ | $L_2$ |
| $r_4 = -30.000$ | $d_4 = 1.0$ | $n_3 = 1.84042$ | $\nu_3 = 43.3$ | ⎬ $G_1$ |
| $r_5 = 31.470$ | $d_5 = 0.5$ | | | |
| $r_6 = 38.359$ | $d_6 = 2.5$ | $n_4 = 1.59507$ | $\nu_4 = 35.5$ | $L_3$ ⎭ |
| $r_7 = -239.379$ | $d_7 = D_2$ | | | |
| $r_8 = -35.298$ | $d_8 = 1.0$ | $n_5 = 1.87739$ | $\nu_5 = 38.1$ | $L_4$ ⎫ |
| $r_9 = 40.0$ | $d_9 = 2.5$ | $n_6 = 1.64831$ | $\nu_6 = 33.8$ | |
| $r_{10} = -577.176$ | $d_{10} = 0.2$ | | | ⎬ $G_2$ |
| $r_{11} = 39.932$ | $d_{11} = 2.5$ | $n_7 = 1.51118$ | $\nu_7 = 50.9$ | $L_5$ ⎭ |
| $r_{12} = 162.674$ | | | | |
| F or M | 94.6353 | $-0.125$ | | |
| $D_0$ | $\infty$ | 742.0465 | | |
| $D_1$ | 1.0 | 7.1386 | $\Delta D_1 = 6.1386$ | |
| $D_2$ | 2.8 | 2.1861 | $\Delta D_2 = -0.6139$ | |
| $B_f$ | 44.9229 | 39.3984 | $\Delta B_f = -5.5246$ | |
| $\alpha = 0$ | $\gamma = 0$ | | $f_R = -57.2996$ | |
| $\alpha_1 = -1.111$ | $\gamma_1 = -0.1$ | | $F_1 = 856.7929$ | |
| $\alpha_2 = 0.111$ | $\gamma_2 = -0.9$ | | $F_2 = -51.9250$ | | where $\beta$ represents the magnification of the rear conversion lens, r represents the radius of curvature of each lens surface, d represents the center thickness and air space of each lens, n represent the refractive index for the d-line ($\lambda = 587.6$ nm), $\nu$ represents the Abbe number, the subscript numbers represent the order from the object side, F represents the combined focal length of the rear conversion lens during infinity in-focus when combined with said objective lens, M represents the combined photographic magnification during very short distance in-focus, $D_0$ represents the distance from the foremost lens surface of the objective lens to the object $D_1$ represents the spacing between the objective lens and the rear conversion lens, $D_2$ represents the spacing between the forward group and the rearward group of the rear conversion lens, $B_f$ represents the back focal length of the composite system, $f_R$ represents the focal length as the rear conversion lens during infinity in-focus, $F_1$ and $F_2$ represent the focal lengths of the forward group and the rearward group, respectively, of the rear conversion lens, $\alpha_1$ and $\alpha_2$ represent the variation rates of the amount of variation $\Delta D_1$ in the spacing between the objective lens and the forward group of the rear conversion lens and the amount of variation $\Delta D_2$ in the spacing between the forward group and the rearward group of the rear conversion lens, respectively, relative to the amount of variation $\Delta B_f$ in the back focal length of the composite system, $\alpha$ represents the variation rate of the amount of variation in the full length relative to $\Delta B_f$, $\gamma_1$ and $\gamma_2$ are the variation rates of the amount of variation $\Delta D_2$ in the spacing between the forward group and the rearward group of the rear conversion lens and the amount of variation $\Delta B_f$ in the back focal length of the composite system, respectively, relative to the amount of variation $\Delta D_1$ in the spacing between the objective lens and the forward group of the rear conversion lens, and $\gamma$ is the variation rate of the amount of variation in the full length relative to $\Delta D_1$.

21. A rear conversion lens according to claim 15, wherein said forward group and said rearward group are both movable toward the object side to be focused to an object at a shorter distance.

22. A rear conversion lens according to claim 21, wherein said forward group has at least two negative lenses and at least one positive lens and said rearward group has a positive lens having its surface of sharper curvature facing the object side.

23. A rear conversion lens according to claim 22, wherein numerical data are as follows:

| | | $\beta = 1.4$ | | |
|---|---|---|---|---|
| $r_1 = 65.785$ | $d_1 = 2.9$ | $n_1 = 1.59507$ | $\nu_1 = 35.5$ | $L_1$ ⎫ |
| $r_2 = -58.904$ | $d_2 = 0.2$ | | | |
| $r_3 = -161.540$ | $d_3 = 1.0$ | $n_2 = 1.84042$ | $\nu_2 = 43.3$ | $L_2$ |
| $r_4 = 27.027$ | $d_4 = 1.0$ | | | ⎬ $G_1$ |
| $r_5 = 34.584$ | $d_5 = 3.3$ | $n_3 = 1.59507$ | $\nu_3 = 35.5$ | $L_3$ |
| $r_6 = -140.675$ | $d_6 = 1.5$ | | | |
| $r_7 = -37.323$ | $d_7 = 1.0$ | $n_4 = 1.84042$ | $\nu_4 = 43.3$ | $L_4$ ⎭ |
| $r_8 = 339.143$ | $d_8 = D_2$ | | | |
| $r_9 = 38.662$ | $d_9 = 2.5$ | $n_5 = 1.46450$ | $\nu_5 = 65.8$ | $L_5$ ⎬ $G_2$ |
| $r_{10} = 162.687$ | | | | |
| F or M | 72.9686 | $-0.1$ | | |
| $D_0$ | $\infty$ | 807.5721 | | |
| $D_1$ | 0.9766 | 0.9766 | $\Delta D_1 = 0$ | |
| $D_2$ | 0.6 | 4.1973 | $\Delta D_2 = 3.5973$ | |
| $B_f$ | 37.9237 | 43.9179 | $\Delta B_f = 5.9942$ | |
| $\alpha = 1.6$ | $\gamma$ ⎫ | cannot be | $f_R = -94.8194$ | |
| $\alpha_1 = 0$ | $\gamma_1$ ⎬ | defined. | $F_1 = -50.817$ | |
| $\alpha_2 = 0.600$ | $\gamma_2$ ⎭ | | $F_2 = 108.485$ | | where $\beta$ represents the magnification of the rear conversion lens, r represents the radius of curvature of each lens surface, d represents the center thickness and air space of each lens, n represents the refractive index for the d-line ($\lambda = 587.6$ nm), $\nu$ represents the Abbe number, the subscript numbers represent the order from the object side, F represents the combined focal length of the rear conversion lens during infinity in-focus when combined with said objective lens, M represents the combined photographic magnification during very short distance in-focus, $D_0$ represents the distance from the foremost lens surface of the objective lens to the object, $D_1$ represents the spacing between the objective lens and the rear conversion lens, $D_2$ represents the spacing between the forward group and the rearward group of the rear conversion lens, $B_f$ represents the back focal length of the composite system, $f_R$ represents the focal length as the rear conversion lens during infinity in-focus, $F_1$ and $F_2$ represent the focal lengths of the forward group and the rearward group, respectively, of the rear conversion lens, $\alpha_1$ and $\alpha_2$ represent the variation rates of the amount of variation $\Delta D_1$ in the spacing between the objective lens and the forward group of the rear conversion lens and the amount of variation $\Delta D_2$ in the spacing between the forward group and the rearward group of the rear conversion lens, respectively, relative to the amount of variation $\Delta B_f$ in the back focal length of the composite system, $\alpha$ represents the variation rate of the amount of variation in the full length relative to $\Delta B_f$, $\gamma_1$ and $\gamma_2$ are the variation rates of the amount of variation $\Delta D_2$ in the spacing between the forward group and the rearward group of the rear conversion lens and the amount of variation $\Delta B_f$ in the back focal length of the composite system, respectively, relative to the amount of variation $\Delta D_1$ in the spacing between the objective lens and the forward group of the rear conversion lens, and $\gamma$ is the variation rate of the amount of variation in the full length relative to $\Delta D_1$.

24. A rear conversion lens according to claim 22, wherein numerical data are as follows:

| | | $\beta = 1.4$ | | | |
|---|---|---|---|---|---|
| $r_1 = 105.531$ | $d_1 = 1.0$ | $n_1 = 1.84042$ | $\nu_1 = 43.3$ | $L_1$ | |
| $r_2 = 29.529$ | $d_2 = 0.5$ | | | | |
| $r_3 = 32.727$ | $d_3 = 4.5$ | $n_2 = 1.59507$ | $\nu_2 = 35.5$ | $L_2$ | |
| $r_4 = -38.160$ | $d_4 = 1.0$ | | | | $G_1$ |
| $r_5 = -49.868$ | $d_5 = 1.0$ | $n_3 = 1.84042$ | $\nu_3 = 43.3$ | $L_3$ | |
| $r_6 = -72.809$ | $d_6 = 1.5$ | | | | |
| $r_7 = -41.039$ | $d_7 = 1.0$ | $n_4 = 1.84042$ | $\nu_4 = 43.3$ | $L_4$ | |
| $r_8 = 116.806$ | $d_8 = D_2$ | | | | |
| $r_9 = 39.085$ | $d_9 = 2.6$ | $n_5 = 1.50137$ | $\nu_5 = 56.5$ | $L_5$ | $G_2$ |
| $r_{10} = 119.484$ | | | | | |

| F or M | 72.9734 | −0.1 | |
|---|---|---|---|
| $D_0$ | ∞ | 802.2745 | |
| $D_1$ | 0.9721 | 0.9721 | $\Delta D_1 = 0$ |
| $D_2$ | 0.6 | 3.1382 | $\Delta D_2 = 2.5382$ |
| $B_f$ | 38.6414 | 44.9871 | $\Delta B_f = 6.3429$ |
| $\alpha = 1.4$ | $\gamma$ | cannot be | $f_R = -96.8924$ |
| $\alpha_1 = 0$ | $\gamma_1$ | defined. | $F_1 = -52.7683$ |
| $\alpha_2 = 0.400$ | $\gamma_2$ | | $F_2 = 114.6142$ | where $\beta$ represents the magnification of the rear conversion lens, r presents the radius of curvature of each lens surface, d represents the center thickness and air space of each lens, n represents the refractive index for the d-line ($\lambda = 587.6$ nm), $\nu$ represents the Abbe number, the subscript numbers represent the order from the object side, F represents the combined focal length of the rear conversion lens during infinity in-focus when combined with said objective lens, M represents the combined photographic magnification during very short distance in-focus, $D_0$ represents the distance from the foremost lens surface of the objective lens to the object, $D_1$ represents the spacing between the objective lens and the rear conversion lens, $D_2$ represents the spacing between the forward group and the rearward group of the rear conversion lens, $B_f$ represents the back focal length of the composite system, $f_R$ represents the focal length as the rear conversion lens during infinity in-focus, $F_1$ and $F_2$ represent the focal lengths of the forward group and the rearward group, respectively, of the rear conversion lens, $\alpha_1$ and $\alpha_2$ represent the variation rates of the amount of variation $\Delta D_1$ in the spacing between the objective lens and the forward group of the rear conversion lens and the amount of variation $\Delta D_2$ in the spacing between the forward group and the rearward group of the rear conversion lens, respectively, relative to the amount of variation $\Delta B_f$ in the back focal length of the composite system, $\alpha$ represents the variation rate of the amount of variation in the full length relative to $\Delta B_f$, $\gamma_1$ and $\gamma_2$ are the variation rates of the amount of variation $\Delta D_2$ in the spacing between the forward group and the rearward group of the rear conversion lens and the amount of variation $\Delta B_f$ in the back focal length of the composite system, respectively, relative to the amount of variation $\Delta D_1$ in the spacing between the objective lens and the forward group of the rear conversion lens, and $\gamma$ is the variation rate of the amount of variation in the full length relative to $\Delta D_1$.

25. A rear conversion lens according to claim 22, wherein numerical data are as follows:

| | | $\beta = 1.4$ | | | |
|---|---|---|---|---|---|
| $r_1 = 143.302$ | $d_1 = 1.0$ | $n_1 = 1.84042$ | $\nu_1 = 43.3$ | $L_1$ | |
| $r_2 = 30.158$ | $d_2 = 0.5$ | | | | |
| $r_3 = 32.727$ | $d_3 = 5.0$ | $n_2 = 1.59507$ | $\nu_2 = 35.5$ | $L_2$ | $G_1$ |
| $r_4 = -38.551$ | $d_4 = 2.5$ | | | | |
| $r_5 = -35.904$ | $d_5 = 1.0$ | $n_3 = 1.84042$ | $\nu_3 = 43.3$ | $L_3$ | |
| $r_6 = 116.807$ | $d_6 = D_2$ | | | | |
| $r_7 = 36.215$ | $d_7 = 2.6$ | $n_4 = 1.50137$ | $\nu_4 = 56.5$ | $L_4$ | $G_2$ |
| $r_8 = 83.782$ | | | | | |

| F or M | 72.9734 | −0.1 | |
|---|---|---|---|
| $D_0$ | ∞ | 802.6944 | |
| $D_1$ | 0.9721 | 0.9721 | $\Delta D_1 = 0$ |
| $D_2$ | 0.6 | 3.3741 | $\Delta D_2 = 2.7741$ |
| $B_f$ | 38.9676 | 45.1322 | $\Delta B_f = 6.1646$ |
| $\alpha = 1.45$ | $\gamma$ | cannot be | $f_R = -97.0969$ |
| $\alpha_1 = 0$ | $\gamma_1$ | defined. | $F_1 = -55.0703$ |
| $\alpha_2 = 0.450$ | $\gamma_2$ | | $F_2 = 124.9465$ | where $\beta$ represents the magnification of the rear conversion lens, r represents the radius of curvature of each lens surface, d represents the center thickness and air space of each lens, n represents the refractive index for the d-line ($\lambda = 587.6$ nm), $\nu$ represents the Abbe number, the subscript numbers represent the order from the object side, F represents the combined focal length of the rear conversion lens during infinity in-focus when combined with said objective lens, M represents the combined photographic magnification during very short distance in-focus, $D_0$ represents the distance from the foremost lens surface of the objective lens to the object, $D_1$ represents the spacing between the objective lens and the rear conversion lens, $D_2$ represents the spacing between the forward group and the rearward group of the rear conversion lens, $B_f$ represents the back focal length of the composite system, $f_R$ represents the focal length as the rear conversion lens during infinity in-focus, $F_1$ and $F_2$ represent the focal lengths of the forward group and the rearward group, respectively, of the rear conversion lens, $\alpha_1$ and $\alpha_2$ represent the variation rates of the amount of variation $\Delta D_1$ in the spacing between the objective lens and the forward group of the rear conversion lens and the amount of variation $\Delta D_2$ in the spacing between the forward group and the rearward group of the rear conversion lens, respectively, relative to the amount of variation $\Delta B_f$ in the back focal length of the composite system, $\alpha$ represents the variation rate of the amount of variation in the full length relative to $\Delta B_f$, $\gamma_1$ and $\gamma_2$ are the variation rates of the amount of variation $\Delta D_2$ in the spacing between the forward group and the rearward group of the rear conversion lens and the amount of variation $\Delta B_f$ in the back focal length of the composite system, respectively, relative to the amount of variation $\Delta D_1$ in the spacing between the objective lens and the forward group of the rear conversion lens, and $\gamma$ is the variation rate of the amount of variation in the full length relative to $\Delta D_1$.

26. A rear conversion lens according to claim 21, wherein said forward group has two positive lenses and a negative lens and said rearward group has a negative lens.

27. A rear conversion lens according to claim 26, wherein numerical data are as follows:

| | | $\beta = 1.4$ | | | |
|---|---|---|---|---|---|
| $r_1 = 500.0$ | $d_1 = 2.5$ | $n_1 = 1.59507$ | $\nu_1 = 35.5$ | $L_1$ | |
| $r_2 = -46.392$ | $d_2 = 0.5$ | | | | |
| $r_3 = -96.993$ | $d_3 = 1.0$ | $n_2 = 1.84042$ | $\nu_2 = 43.3$ | $L_2$ | $G_1$ |
| $r_4 = 31.188$ | $d_4 = 1.0$ | | | | |
| $r_5 = 28.247$ | $d_5 = 4.0$ | $n_3 = 1.59507$ | $\nu_3 = 35.5$ | $L_3$ | |
| $r_6 = -132.460$ | $d_6 = D_2$ | | | | |
| $r_7 = -31.476$ | $d_7 = 1.0$ | $n_4 = 1.90265$ | $\nu_4 = 35.8$ | $L_4$ | $G_2$ |
| $r_8 = -67.136$ | | | | | |

| F or M | 72.9738 | −0.1 | |
|---|---|---|---|
| $D_0$ | ∞ | 787.2736 | |
| $D_1$ | 1.0 | 1.0 | $\Delta D_1 = 0$ |
| $D_2$ | 2.8 | 3.1212 | $\Delta D_2 = 0.3212$ |
| $B_f$ | 38.8244 | 45.2511 | $\Delta B_f = 6.4267$ |

| $\alpha = 1.05$ | $\gamma$ | cannot be defined. | $f_R = -95.8404$ |
|---|---|---|---|
| $\alpha_1 = 0$ | $\gamma_1$ | | $F_1 = 218.5363$ |
| $\alpha_2 = 0.05$ | $\gamma_2$ | | $F_2 = -66.5334$ | where $\beta$ represents the magnification of the rear conversion lens, r represents the radius of curvature of each lens surface, d represents the center thickness and air space of each lens, n represents the refractive index for the d-line ($\lambda = 587.6$ nm), $\nu$ represents the Abbe number, the subscript numbers represent the order from the object side, F represents the combined focal length of the rear conversion lens during infinity in-focus when combined with said objective lens, M represents the combined photographic magnification during very short distance in-focus, $D_0$ represents the distance from the foremost lens surface of the objective lens to the object, $D_1$ represents the spacing between the objective lens and the rear conversion lens, $D_2$ represents the spacing between the forward group and the rearward group of the rear conversion lens, $B_f$ represents the back focal length of the composite system, $f_R$ represents the focal length as the rear conversion lens during infinity in-focus, $F_1$ and $F_2$ represent the focal lengths of the forward group and the rearward group, respectively, of the rear conversion lens, $\alpha_1$ and $\alpha_2$ represent the variation rates of the amount of variation $\Delta D_1$ in the spacing between the objective lens and the forward group of the rear conversion lens and the amount of variation $\Delta D_2$ in the spacing between the forward group and the rearward group of the rear conversion lens, respectively, relative to the amount of variation $\Delta B_f$ in the back focal length of the composite system, $\alpha$ represents the variation rate of the amount of variation in the full length relative to $\Delta B_f$, $\gamma_1$ and $\gamma_2$ are the variation rates of the amount of variation $\Delta D_2$ in the spacing between the forward group and the rearward group of the rear conversion lens and the amount of variation $\Delta B_f$ in the back focal length of the composite system, respectively, relative to the amount of variation $\Delta D_1$ in the spacing between the objective lens and the forward group of the rear conversion lens, and $\gamma$ is the variation rate of the amount of variation in the full length relative to $\Delta D_1$.

28. A rear conversion lens according to claim 15, wherein said forward group is movable toward the image side to be focused to an object at a shorter distance and said rearward group is stationary.

29. A rear conversion lens according to claim 28, wherein said forward group has a positive lens and three negative lenses and said rearward group has a positive meniscus lens having its convex surface facing the object side.

30. A rear conversion lens according to claim 29, wherein numerical data are as follows:

| | | $\beta = 1.4$ | | | |
|---|---|---|---|---|---|
| $r_1 = 74.260$ | $d_1 = 1.0$ | $n_1 = 1.84042$ | $\nu_1 = 43.3$ | $L_1$ | |
| $r_2 = 28.691$ | $d_2 = 0.5$ | | | | |
| $r_3 = 32.727$ | $d_3 = 4.5$ | $n_2 = 1.59507$ | $\nu_2 = 35.5$ | $L_2$ | |
| $r_4 = -40.0$ | $d_4 = 1.0$ | | | | $G_1$ |
| $r_5 = -59.815$ | $d_5 = 1.0$ | $n_3 = 1.84042$ | $\nu_3 = 43.3$ | $L_3$ | |
| $r_6 = -140.152$ | $d_6 = 1.3$ | | | | |
| $r_7 = -42.637$ | $d_7 = 1.0$ | $n_4 = 1.84042$ | $\nu_4 = 43.3$ | $L_4$ | |
| $r_8 = 105.870$ | $d_8 = D_2$ | | | | |
| $r_9 = 40.335$ | $d_9 = 2.4$ | $n_5 = 1.50137$ | $\nu_5 = 56.5$ | $L_5$ | $G_2$ |
| $r_{10} = 155.251$ | | | | | |

| F or M | 72.9734 | −0.1 | |
|---|---|---|---|
| $D_0$ | ∞ | 749.5993 | |
| $D_1$ | 1.0 | 4.8062 | $\Delta D_1 = 3.8062$ |
| $D_2$ | 1.2 | 0.5149 | $\Delta D_2 = -0.6851$ |
| $B_f$ | 38.0912 | 38.0912 | $\Delta B_f = 0$ |

| $\alpha$ | cannot be defined. | $\gamma = 0.82$ | $f_R = -95.9395$ |
|---|---|---|---|
| $\alpha_1$ | | $\gamma_1 = -0.18$ | $F_1 = -50.9159$ |
| $\alpha_2$ | | $\gamma_2 = 0$ | $F_2 = 107.9336$ | where $\beta$ represents the magnification of the rear conversion lens, r represents the radius of curvature of each lens surface, d represents the center thickness and air space of each lens, n represents the refractive index for the d-line ($\lambda = 587.6$ nm), $\nu$ represents the Abbe number, the subscript numbers represent the order from the object side, F represents the combined focal length of the rear conversion lens during infinity in-focus when combined with said objective lens, M represents the combined photographic magnification during very short distance in-focus, $D_0$ represents the distance from the foremost lens surface of the objective lens to the object, $D_1$ represents the spacing between the objective lens and the rear conversion lens, $D_2$ represents the spacing between the forward group and the rearward group of the rear conversion lens, $B_f$ represents the back focal length of the composite system, $f_R$ represents the focal length as the rear conversion lens during infinity in-focus, $F_1$ and $F_2$ represent the focal lengths of the forward group and the rearward group, respectively, of the rear conversion lens, $\alpha_1$ and $\alpha_2$ represent the variation rates of the amount of variation $\Delta D_1$ in the spacing between the objective lens and the forward group of the rear conversion lens and the amount of variation $\Delta D_2$ in the spacing between the forward group and the rearward group of the rear conversion lens, respectively, relative to the amount of variation $\Delta B_f$ in the back focal length of the composite system, $\alpha$ represents the variation rate of the amount of variation in the full length relative to $\Delta B_f$, $\gamma_1$ and $\gamma_2$ are the variation rates of the amount of variation $\Delta D_2$ in the spacing between the forward group and the rearward group of the rear conversion lens and the amount of variation $\Delta B_f$ in the back focal length of the composite system, respectively, relative to the amount of variation $\Delta D_1$ in the spacing between the objective lens and the forward group of the rear conversion lens, and $\gamma$ is the variation rate of the amount of variation in the full length relative to $\Delta D_1$.

31. A rear conversion lens removably mounted between an objective lens and a camera body for making the combined focal length of the rear conversion lens and the objective lens greater than the focal length of the objective lens, including:
   a converter barrel;
   a lens group of negative refractive power movable in said converter barrel along the optical axis for converting a convergent light beam from said objective lens to a less convergent light beam and for condensing the light beam on an image plane in said camera body; and means for moving said lens group of negative refractive power along said optical axis from a first position to a second position with respect to said objective lens;

focusing to infinity being effected through said objective lens by moving said lens group of negative refractive power to said first position while maintaining said objective lens in infinity in-focus state, and focusing to a short distance being effected through said objective lens by moving said lens group of negative refractive power to said second position.

32. A rear conversion lens according to claim 31, wherein focusing to a shorter distance than the short distance to which focusing is attainable by only said objective lens is effected by moving said lens group of negative refractive power from said first position to said second position while maintaining said objective lens in short distance in-focus state.

* * * * *